United States Patent
Chen

(10) Patent No.: US 9,465,506 B2
(45) Date of Patent: Oct. 11, 2016

(54) SYSTEM AND METHOD FOR DISPLAYING ADDITIONAL INFORMATION ASSOCIATED WITH A MESSAGING CONTACT IN A MESSAGE EXCHANGE USER INTERFACE

(75) Inventor: Henry Yao-Tsu Chen, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 489 days.

(21) Appl. No.: 13/211,670

(22) Filed: Aug. 17, 2011

(65) Prior Publication Data
US 2013/0047104 A1 Feb. 21, 2013

(51) Int. Cl.
*G06F 3/0481* (2013.01)
*G06F 3/0482* (2013.01)
*H04M 1/725* (2006.01)

(52) U.S. Cl.
CPC ........ *G06F 3/0481* (2013.01); *G06F 3/0482* (2013.01); *G06F 3/04817* (2013.01); *H04M 1/72552* (2013.01)

(58) Field of Classification Search
CPC .. G06F 3/0481; G06F 9/4443; G06F 3/0482; G06Q 10/107; H04L 12/585; H04L 12/581; H04L 12/5855; G09G 5/14; H04M 1/72552
USPC .................. 715/765, 808; 709/206
See application file for complete search history.

(56) References Cited

U.S. PATENT DOCUMENTS

| | | | |
|---|---|---|---|
| 7,266,776 B2 | 9/2007 | Quillen et al. | |
| 7,278,108 B2 | 10/2007 | Duarte et al. | |
| 7,284,002 B2 | 10/2007 | Doss et al. | |
| 7,584,258 B2 | 9/2009 | Maresh | |
| 7,606,866 B2 | 10/2009 | Mora | |
| 7,617,457 B2 | 11/2009 | Kortum et al. | |

(Continued)

FOREIGN PATENT DOCUMENTS

| | | |
|---|---|---|
| CA | 2716850 A1 | 4/2011 |
| EP | 2224653 B1 | 6/2011 |
| WO | WO 2011/069018 A1 | 6/2011 |

OTHER PUBLICATIONS

Goldring, D; Extract from iWindows Mobile Updates SMS-Chat; May 9, 2008; taken from http://www.mytodayscreen.com/iwindows-mobile-updates-sms-chat/.

(Continued)

*Primary Examiner* — Li Sun
(74) *Attorney, Agent, or Firm* — Jeffrey N. Giunta; Fleit Gibbons Gutman Bongini & Bianco P.L.

(57) ABSTRACT

An unobtrusive tab is provided in a user interface (UI) used in communicating with a contact, for providing a notification of new information, and to enable access to the information or a representation of the information. The items provided in the information pane may also be selectable to enable further information to be displayed, e.g. an application related to or containing the selected item. Various data items can also be associated with items in the information pane in order to enable further content and information to be launched through selection of an item in the information pane. The information pane can be used as an alternative communication channel and portal for sending and receiving data items such as links, pictures, or other attachments to enable sharing between contacts without disrupting or cluttering a conversational exchange or consuming resources in a particular communication medium.

18 Claims, 21 Drawing Sheets

(56) References Cited

U.S. PATENT DOCUMENTS

| | | |
|---|---|---|
| 7,631,042 B2 | 12/2009 | Chen et al. |
| 7,707,226 B1 | 4/2010 | Tonse |
| 7,707,286 B2 | 4/2010 | Gundu et al. |
| 7,711,810 B2 | 5/2010 | McKinnon et al. |
| 7,844,667 B2 | 11/2010 | Ito et al. |
| 7,996,045 B1 * | 8/2011 | Bauer ................ G06F 3/0488 455/466 |
| 8,099,464 B2 * | 1/2012 | Cooperman et al. ......... 709/206 |
| 2003/0208543 A1 * | 11/2003 | Enete et al. ................ 709/206 |
| 2005/0055405 A1 | 3/2005 | Kaminsky et al. |
| 2005/0165880 A1 * | 7/2005 | Moody et al. ............... 709/200 |
| 2006/0004911 A1 | 1/2006 | Becker et al. |
| 2006/0020904 A1 | 1/2006 | Aaltonen et al. |
| 2006/0031341 A1 | 2/2006 | White et al. |
| 2006/0048061 A1 | 3/2006 | Forlenza et al. |
| 2006/0085752 A1 * | 4/2006 | Beadle et al. ............... 715/751 |
| 2006/0190117 A1 | 8/2006 | Weczorek et al. |
| 2007/0113181 A1 | 5/2007 | Blattner et al. |
| 2007/0168863 A1 | 7/2007 | Blattner et al. |
| 2007/0179037 A1 | 8/2007 | Dobrovolsky |
| 2007/0260730 A1 | 11/2007 | Gadwale |
| 2008/0040675 A1 | 2/2008 | Canfield et al. |
| 2009/0006566 A1 * | 1/2009 | Veeramachaneni et al. . 709/206 |
| 2009/0063677 A1 | 3/2009 | Forlenza et al. |
| 2009/0249247 A1 * | 10/2009 | Tseng et al. ................. 715/808 |
| 2010/0075650 A1 | 3/2010 | Tsai et al. |
| 2011/0296312 A1 * | 12/2011 | Boyer ................ G06F 3/0488 715/736 |

OTHER PUBLICATIONS

Linco, R.; Search Report from corresponding PCT Application No. PCT/CA2012/050563; search completed Dec. 4, 2012.

Amarotti, M.; Search Report from corresponding European Application No. 11177822.1; search completed Jan. 23, 2012.

* cited by examiner

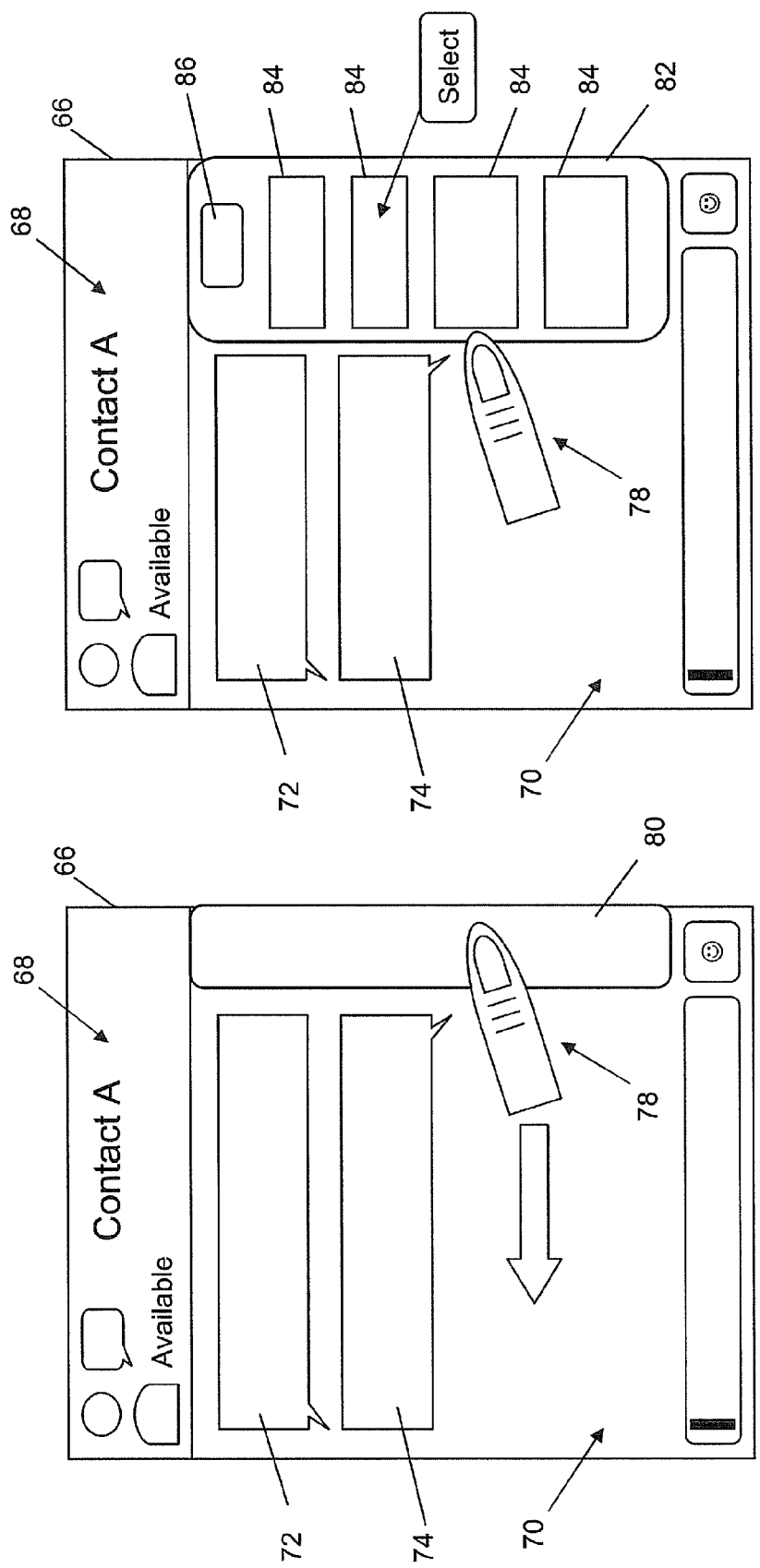

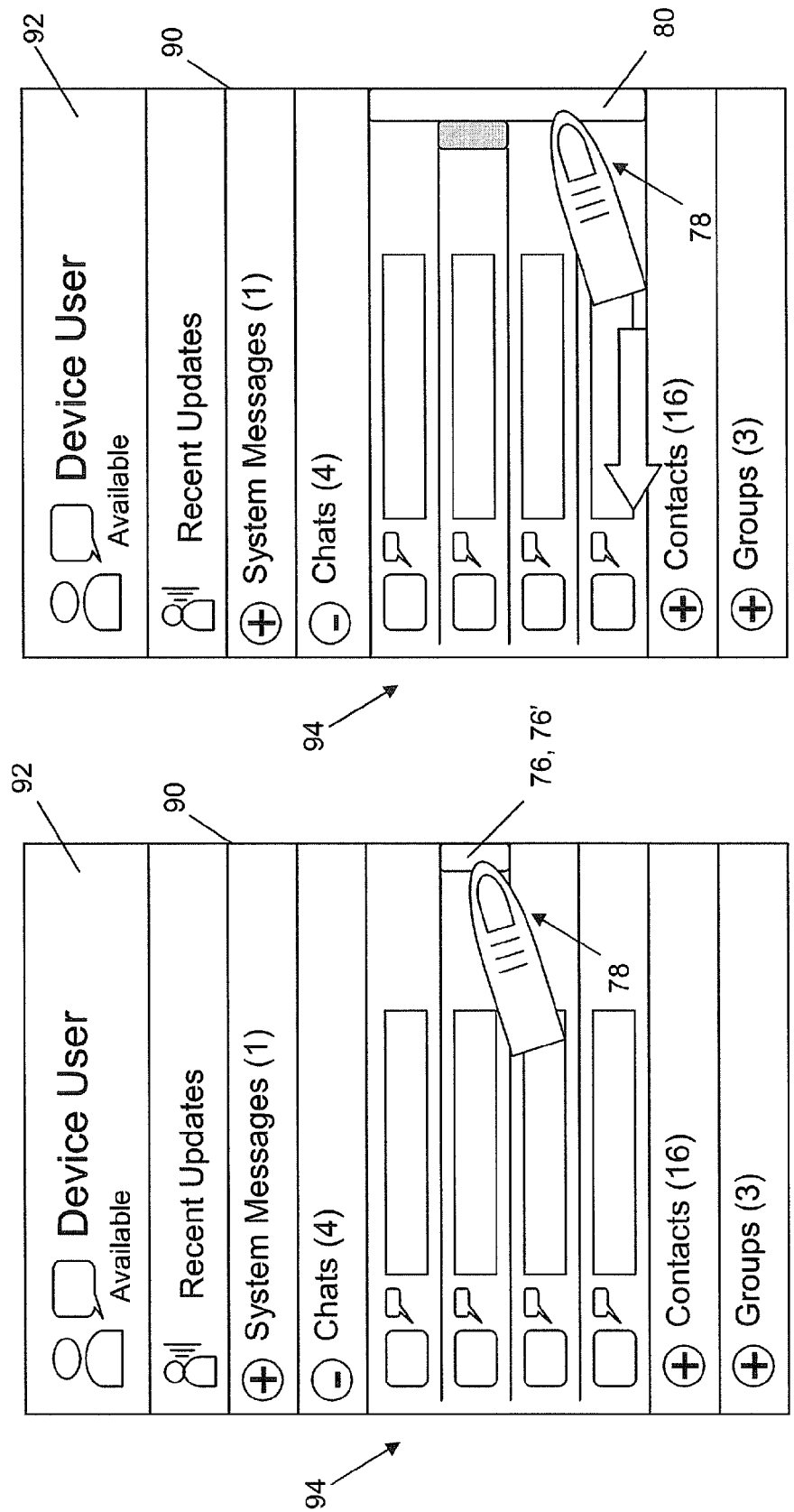

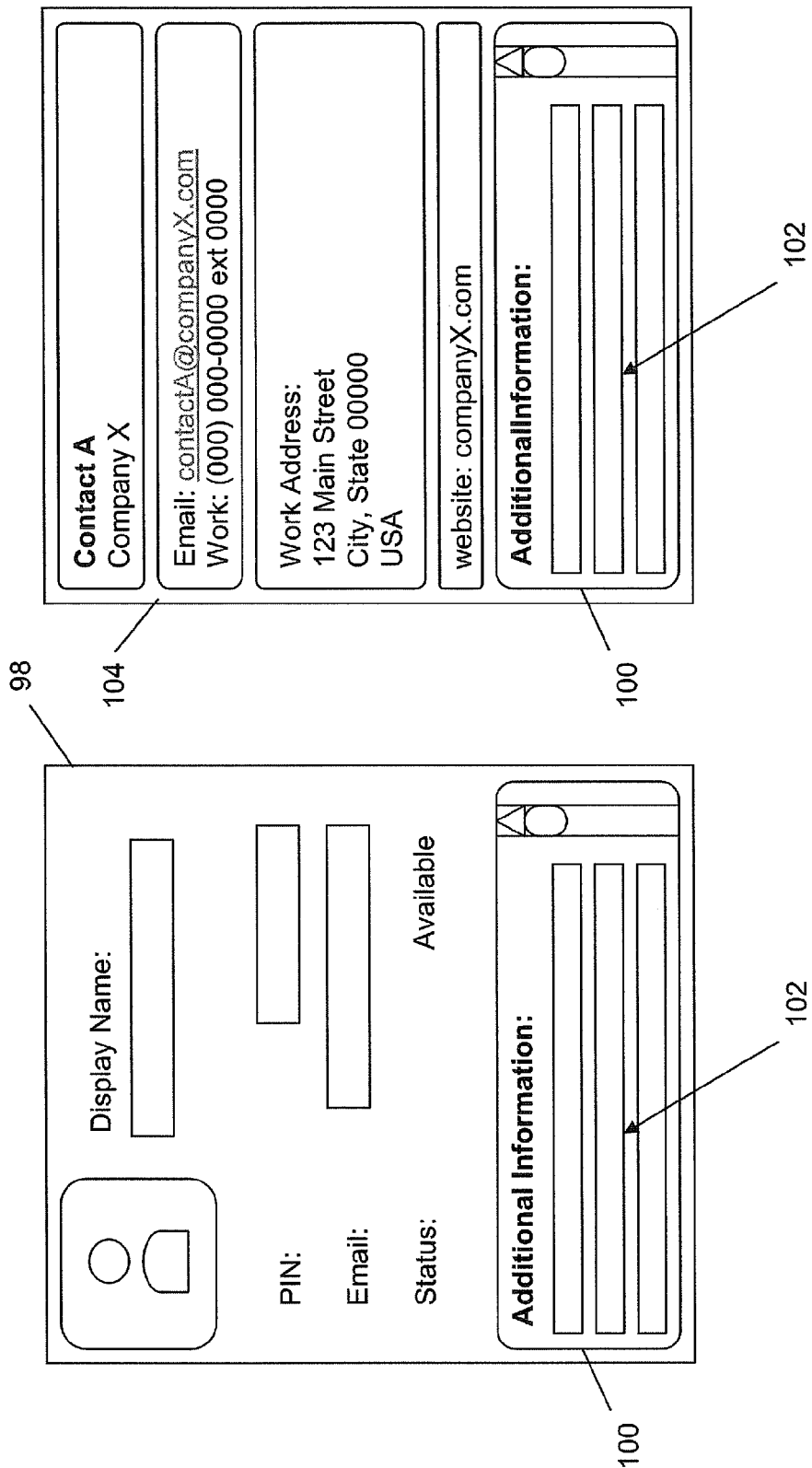

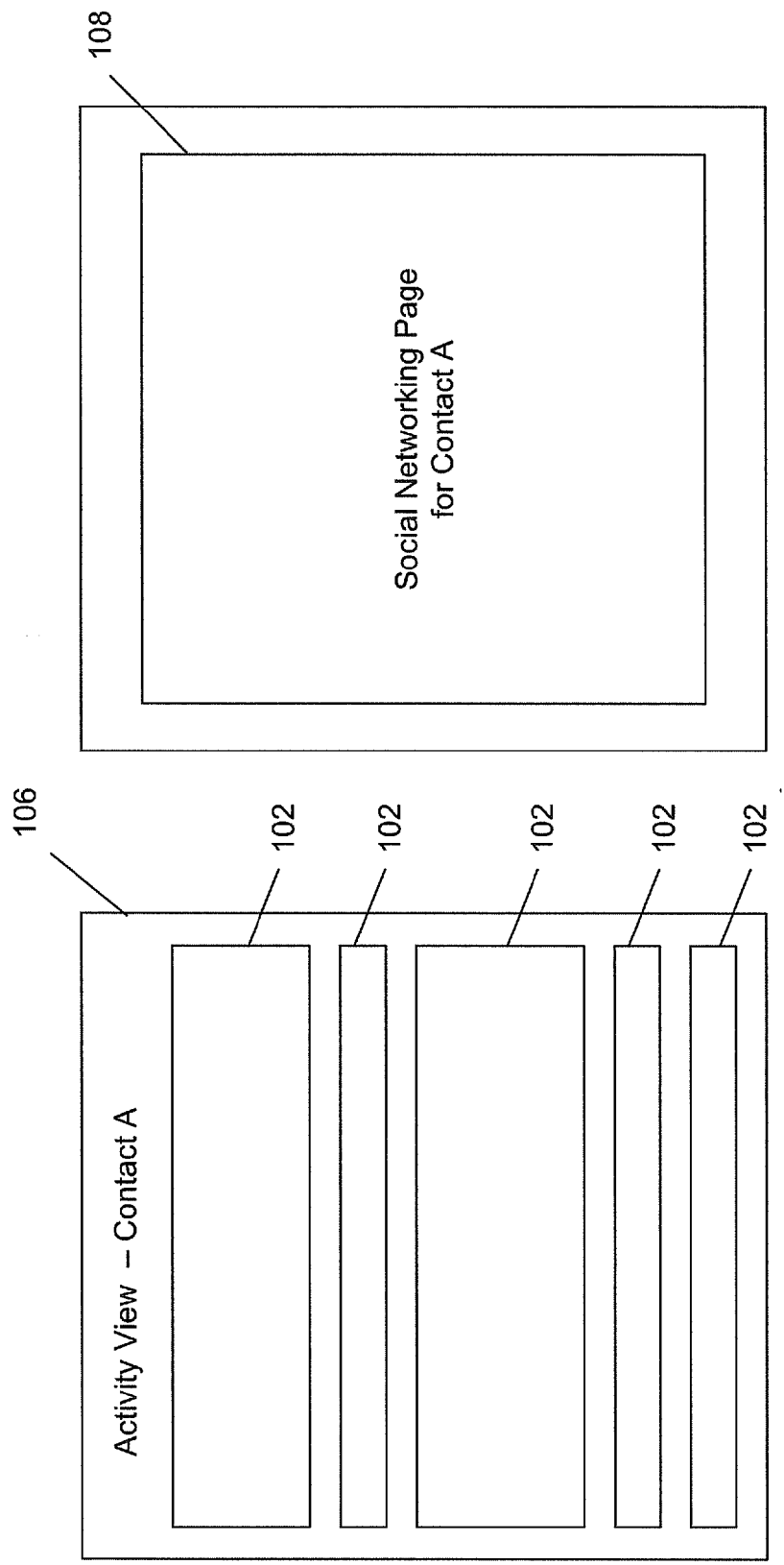

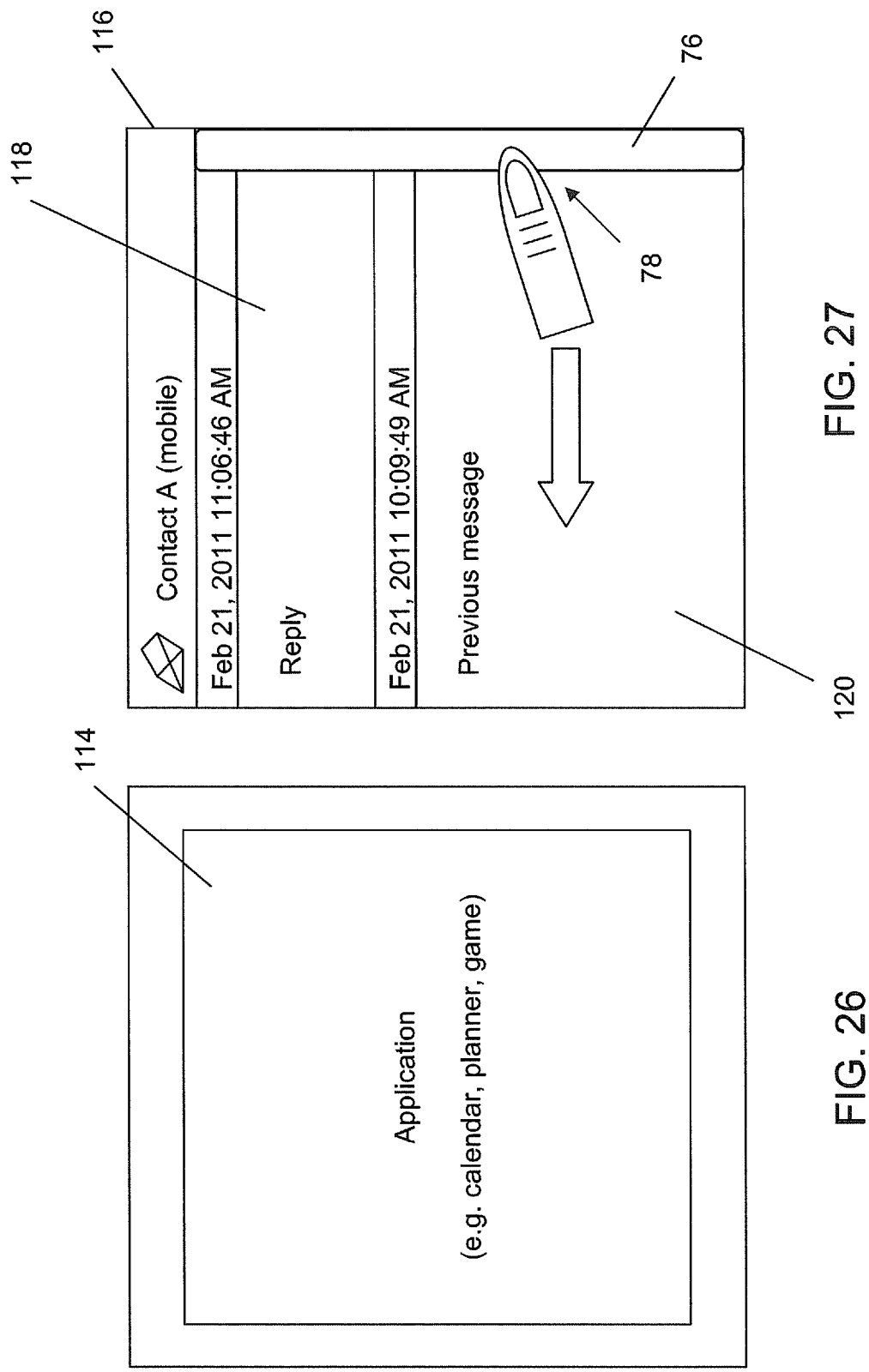

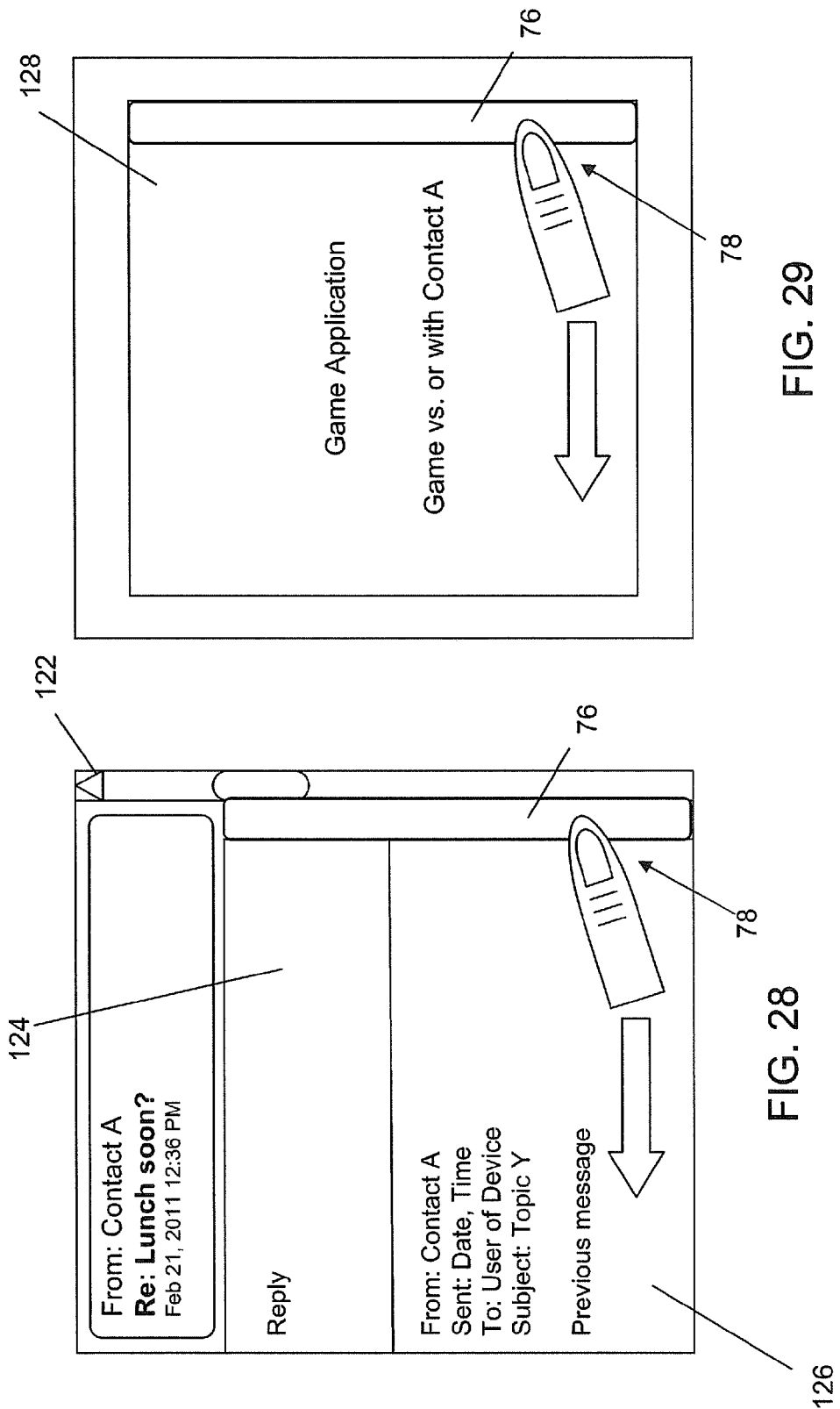

SYSTEM AND METHOD FOR DISPLAYING ADDITIONAL INFORMATION ASSOCIATED WITH A MESSAGING CONTACT IN A MESSAGE EXCHANGE USER INTERFACE

TECHNICAL FIELD

The following relates generally to systems and methods for providing information associated with messaging contacts.

BACKGROUND

Mobile communication devices are often used to communicate via several different media. For example, a smart phone or personal digital assistant (PDA) having wireless communication capabilities may be used to participate in cellular telephone conversations, to exchange email, to exchange short messaging service (SMS) or multimedia messaging service (MMS) messages, to participate in instant messaging (IM or IMing) or other conversational type message exchanges, to post or receive social networking updates, receive data from web-based services, etc.

Users communicating using mobile communication devices may wish to ascertain not only the availability of their contacts, but also information that may affect those contacts. Such information may be available through services such as presence management, but in some cases, may not provide adequate context for the user.

BRIEF DESCRIPTION OF THE DRAWINGS

Embodiments will now be described by way of example only with reference to the appended drawings wherein:

FIG. 10 is a screen shot of an example IM conversation UI including the information tab illustrated in FIG. 6 during a drag operation.

FIG. 11 is a screen shot of an example IM conversation UI including an information pane displayed subsequent to the drag operation illustrated in FIG. 10.

FIG. 16 is a screen shot of an example IM list view UI including an information tab in association with a contact in the list view UI.

FIG. 17 is a screen shot of an example IM conversation UI including the information tab illustrated in FIG. 12 when selected to initiate a drag operation.

FIG. 20 is a screen shot of an example IM profile UI including activity information.

FIG. 21 is a screen shot of an example contact profile UI including activity information.

FIG. 22 is a screen shot of an example activity view UI for a contact.

FIG. 23 is a screen shot of an example social networking application UI for a contact.

FIG. 26 is a screen shot of an example application UI.

FIG. 27 is a screen shot of an example SMS message UI including an information tab.

FIG. 28 is a screen shot of an example email message UI including an information tab.

FIG. 29 is a screen shot of an example game application UI including an information tab.

DETAILED DESCRIPTION OF THE DRAWINGS

Figure 1:
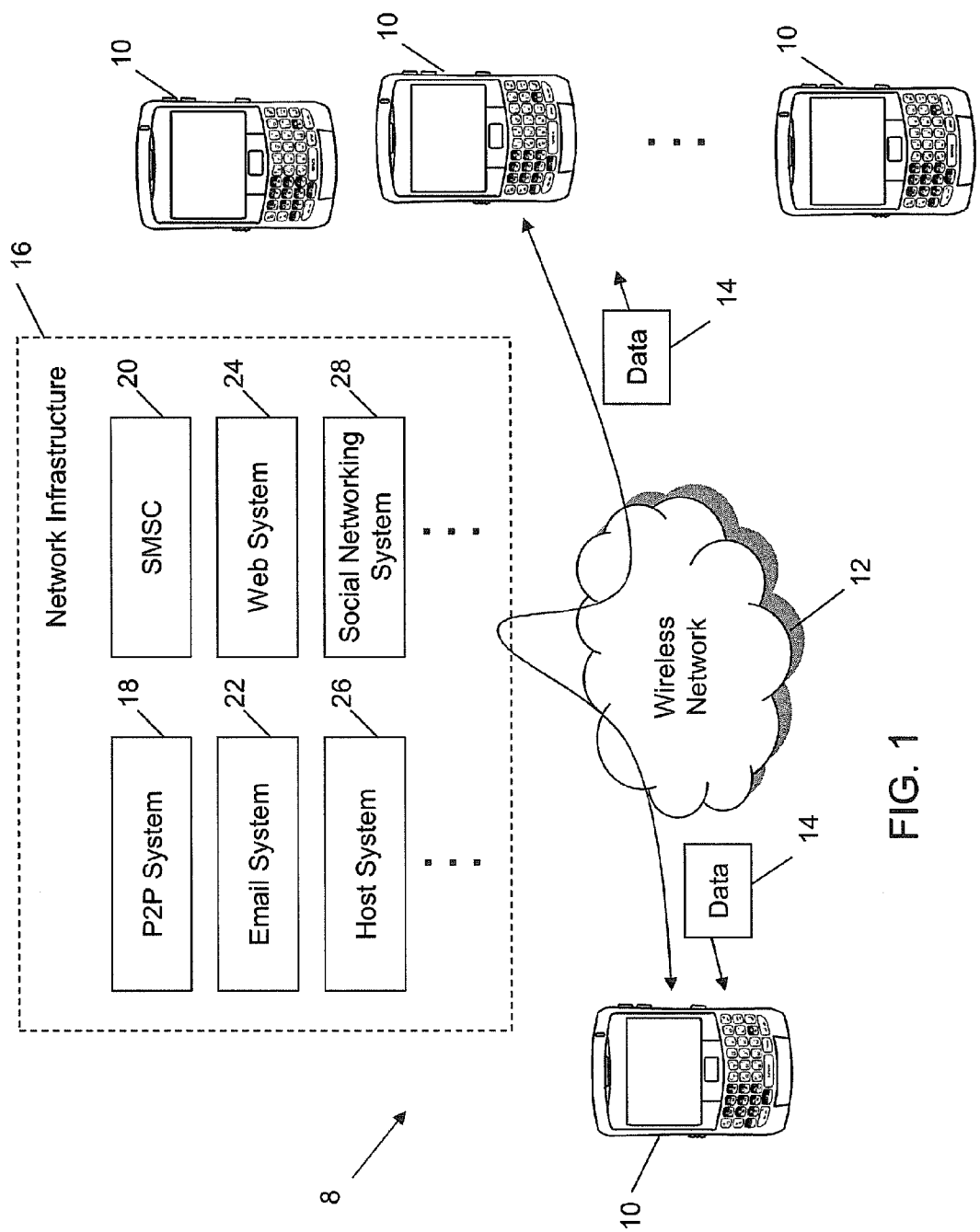
FIG. 1 is a block diagram of an example wireless communication system.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practised without these specific details. In other instances, well-known methods, procedures and components have not been described in detail so as not to obscure the example embodiments described herein. Also, the description is not to be considered as limiting the scope of the example embodiments described herein.

To provide context with respect to activities concerning a contact, information associated with that contact can be provided in addition to messages and other data exchanged with that contact. By providing an unobtrusive tab in a user interface (UI) used in communicating with the contact, a mechanism is available to provide a notification of new information, and to enable access to the information or a representation of the information. For example, a narrow tab may be provide along one edge of an IM conversation screen that can be dragged or "pulled" to resize the tab and display an information pane including one or more items related to a contact in the conversation.

The items provided in the information pane may also be selectable to enable further information to be displayed, e.g., an application related to or containing the selected item. For example, an update related to a social networking application may be represented in the information pane, wherein selection of the update causes the social networking application UI to be displayed. Similarly, links to content (e.g., via a web browser), invitations to join games, attachments (e.g., photos, documents, videos, etc.) and various other data items can also be associated with items in the information pane in order to enable further content and information to be launched through selection of an item in the information pane. Moreover, the information pane can be used as an alternative communication channel and portal for sending and receiving data items such as links, pictures, or other attachments to enable sharing between contacts without disrupting or cluttering a conversational exchange or consuming resources in a particular communication medium.

Although the principles discussed below are applicable to any electronic communication device, examples will be provided for a mobile communication device, which is one of many types of electronic communication devices.

For clarity in the discussion below, mobile communication devices may be commonly referred to as "mobile devices" for brevity. Examples of applicable mobile devices may include, without limitation, cellular phones, smartphones, wireless organizers, pagers, personal digital assistants, laptops, handheld or other wireless communication devices, wirelessly enabled notebook computers, portable gaming devices, tablet computers, or any other portable electronic device with processing and communication capabilities.

Turning to FIG. 1, an example communication system 8 is shown. The communication system 8, in this example, enables, at least in part, mobile devices 10 to communicate with each other via a wireless network 12. For example, as shown, data 14 may be exchanged between various mobile devices 10. Data 14 that is sent from one mobile device 10 to another mobile device 10 may be transmitted according to a particular messaging or communication medium, protocol, or other mechanism. For example, as shown in FIG. 1, data 14 may be sent over the wireless network 12 via a component of a network infrastructure 16. It can be appreciated that the network infrastructure 16 shown in FIG. 1 is illustrative only and any component shown within the dashed lines may also or instead be operated by or within another infrastructure or entity. In this example, the network infrastructure 16 includes various example systems that may be used by the mobile devices 10 to exchange data 14. The non-exhaustive list of examples shown in FIG. 1 includes a peer-to-peer (P2P) system 18 (e.g., IM system), a short message service centre 20 (SMSC), an email system 22 (e.g., web-based, enterprise based, or otherwise), a web system 24 (e.g., hosting a website or web service), a host system 26 (e.g., enterprise server), and a social networking system 28.

The mobile devices 10 may therefore send data to or receive data from other mobile devices 10 via one of the example systems with which the mobile devices 10 are communicable via the wireless network 12 and network infrastructure 16. A mobile device 10 and its corresponding user(s) may be designated by another mobile device 10 as a contact. As will be discussed in greater detail below, mobile devices 10 may store information associated with various contacts in order to facilitate communicating with that contact via at least one medium. For example, a contact may be reachable via any combination of telephone, email, IM, SMS, and social networking applications. A contact profile 53 (see also FIG. 5) can be stored for that contact to enable the mobile device 10 to conveniently communicate with the contact over a desired medium without having to necessarily enter contact information (e.g., addresses) each and every time they wish to communicate with that contact. In addition to information enabling the mobile device 10 to communicate with the contact, a contact profile 53 can include additional information and data such as an avatar, physical (mailing) address, personal information, professional information, etc. As discussed above, in order to provide context with respect to activities concerning a contact, information associated with that contact can be provided in addition to messages and other data exchanged with that contact. By providing an unobtrusive tab in a user interface (UI) used in communicating with the contact, a mechanism is available to provide a notification of new information, and to enable access to the information or a representation of the information.

Figure 2:
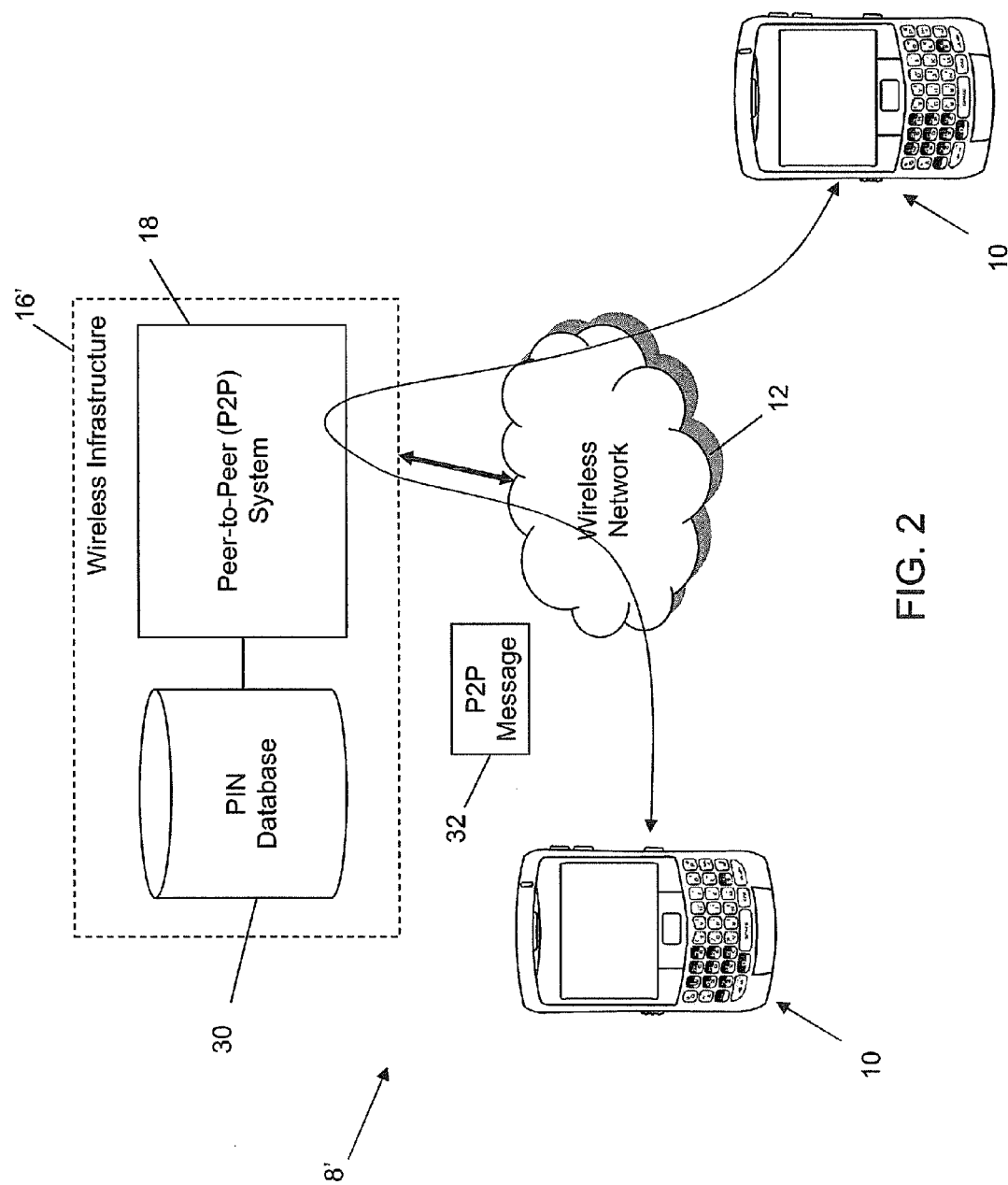
FIG. 2 is a block diagram of an example wireless communication system including a peer-to-peer (P2P) system.

An example embodiment of a communication system 8' including a wireless infrastructure 16', is shown in FIG. 2. The communication system 8' at least in part, enables mobile devices 10 to communicate via a P2P system 18 over the wireless network 12. It will be appreciated that the mobile devices 10 shown in FIG. 2 are for illustrative purposes only and many other mobile devices 10 (not shown) may also be capable of communicating with or within the communication system 8'. It will also be appreciated that although the examples shown herein are directed to mobile communication devices, the same principles may apply to other devices capable of communicating with the P2P system 18. For example, an application (not shown) hosted by a desktop computer or other "non-portable" or "non-mobile" device may also be capable of communicating with other devices (e.g., including mobile devices 10) using the P2P system 18.

The P2P system 18 is, in this example, a component of the wireless infrastructure 16' associated with the wireless network 12. The wireless infrastructure 16' in this example includes, in addition to the P2P system 18, and among other things not shown for simplicity, a person identification number (PIN) database 30. The PIN database 30 in this example is used to store one or more PINs associated with particular mobile devices 10, whether they are subscribers to a service provided by the wireless infrastructure 16' or otherwise.

One of the mobile devices 10 may communicate with the other of the mobile devices 10 and vice versa via the P2P system 18, in order to perform P2P messaging or to otherwise exchange P2P-based communications. For ease of explanation, in the following examples, any P2P-based communication may also be referred to as a P2P message 32 as shown in FIG. 2.

Figure 3:
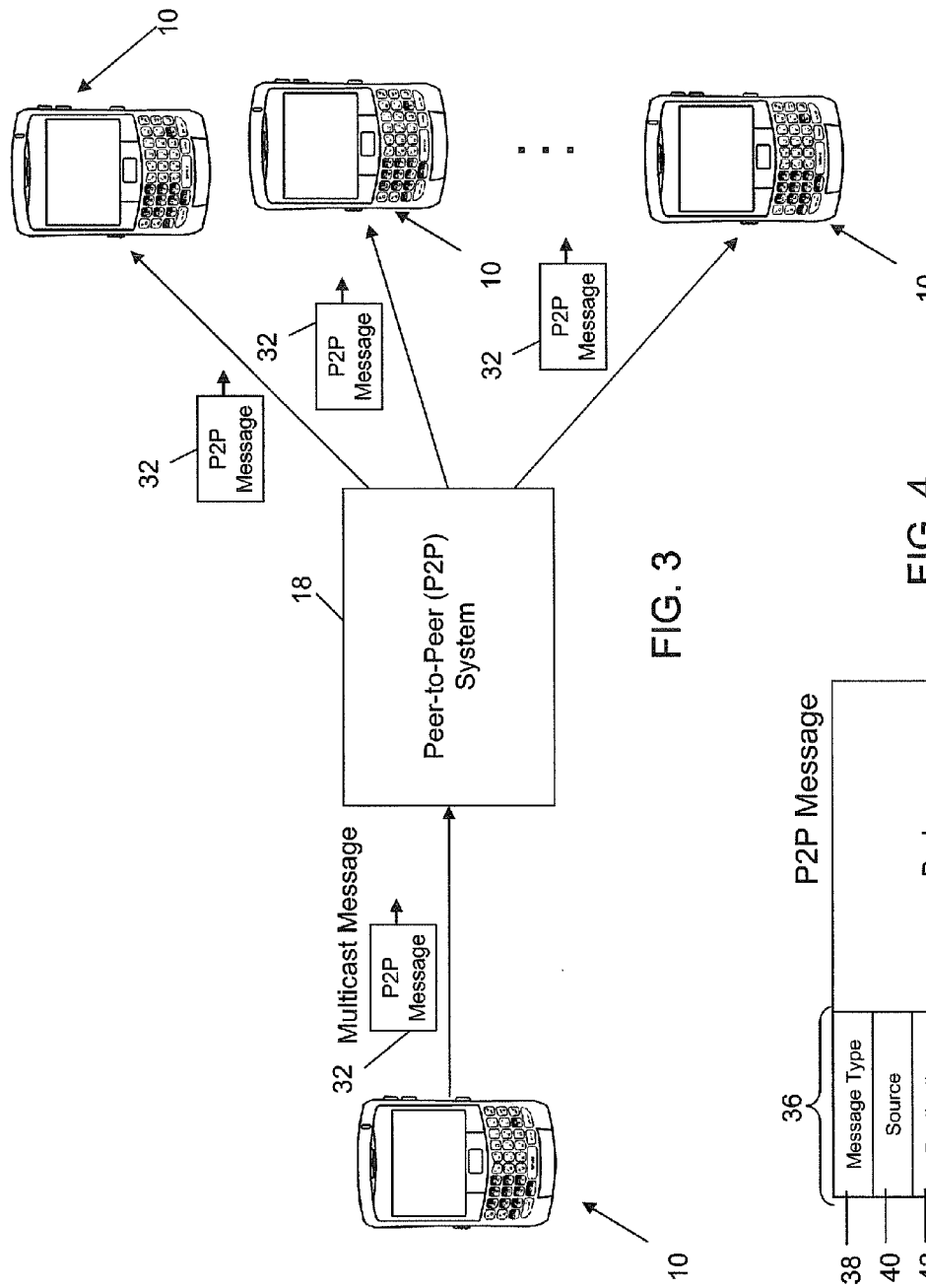
FIG. 3 is a block diagram of an example communication of a multi-cast P2P message via the P2P system of FIG. 1.

In some examples, the P2P system 18 may be capable of sending multi-cast messages, i.e. forwarding a single message from a sender to multiple recipients without requiring multiple messages 32 to be generated by such sender. For example, as shown in FIG. 3, the P2P system 18 can be operable to enable a single P2P message 32 to be sent to multiple recipients by addressing the P2P message 32 to multiple corresponding P2P addresses, and having the P2P system 18 multicast the message 32 to those recipients.

Figure 4:
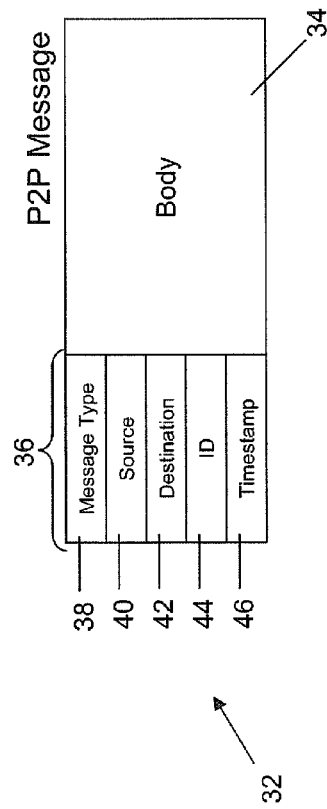
FIG. 4 is a block diagram illustrating an example P2P message.

An example P2P message 32 is shown in greater detail in FIG. 4, and has a format that is particularly suitable for a PIN-to-PIN based system. In a typical P2P protocol, each P2P message 32 has associated therewith a source corresponding to the mobile device 10 which has sent the P2P message 32 and includes a destination identifying the one or more intended recipients. Each P2P message 32 in this example includes a body 34, which contains the content for the P2P message 32 (e.g., text or other data), and a header 36, which contains various fields used for transmitting and processing each P2P message 32. In this example, the header 36 includes a message type field 38 to specify the type of transmission (e.g., chat, registration, block, presence, etc.), a source field 40 to specify the device address for the sender, a destination field 42 to specify the device address(es) for the one or more intended recipients, an ID field 44 to identify the corresponding P2P application (e.g., see IM application 61 in FIG. 5) and a timestamp field 46 to indicate the time (and if desired, the date) at which the P2P message 32 was sent by the designated sender.

It can be appreciated that in this example, the ID field 44 can be used to specify the application ID to identify a P2P application on the mobile device 10. Where the P2P application relates to, for example, an IM system, the message type field 38 can also be used to designate an IM communication, and the ID field 44 may then correspond to a conversation ID, i.e. a conversation thread the message 32 corresponds to (e.g., such that each message 32 is identified by the conversation in which it was sent).

It will be appreciated that other information or attributes may be included in the P2P message 32, such as a subject field (not shown) to enable a subject for part or all of a conversation (in an IM embodiment) to be transported with the P2P message 32 (e.g., to create new subjects, modify subjects, notify others of subjects, etc.), or application details field (not shown) to provide application-specific information such as the version and capabilities of the application.

The P2P system 18 can utilize any suitable P2P protocol operated by, for example, a P2P router (not shown), which may be part of the wireless infrastructure 16'. It can be appreciated however that a stand-alone P2P configuration (i.e. that does not rely on the wireless infrastructure 16'—not shown) may equally apply the principles herein. The P2P system 18 may also enable mobile devices 10 to communicate with desktop computers thus facilitating, for example, communications such as instant messaging (IM) between mobile applications and desktop applications on the desktop computer.

Figure 5:
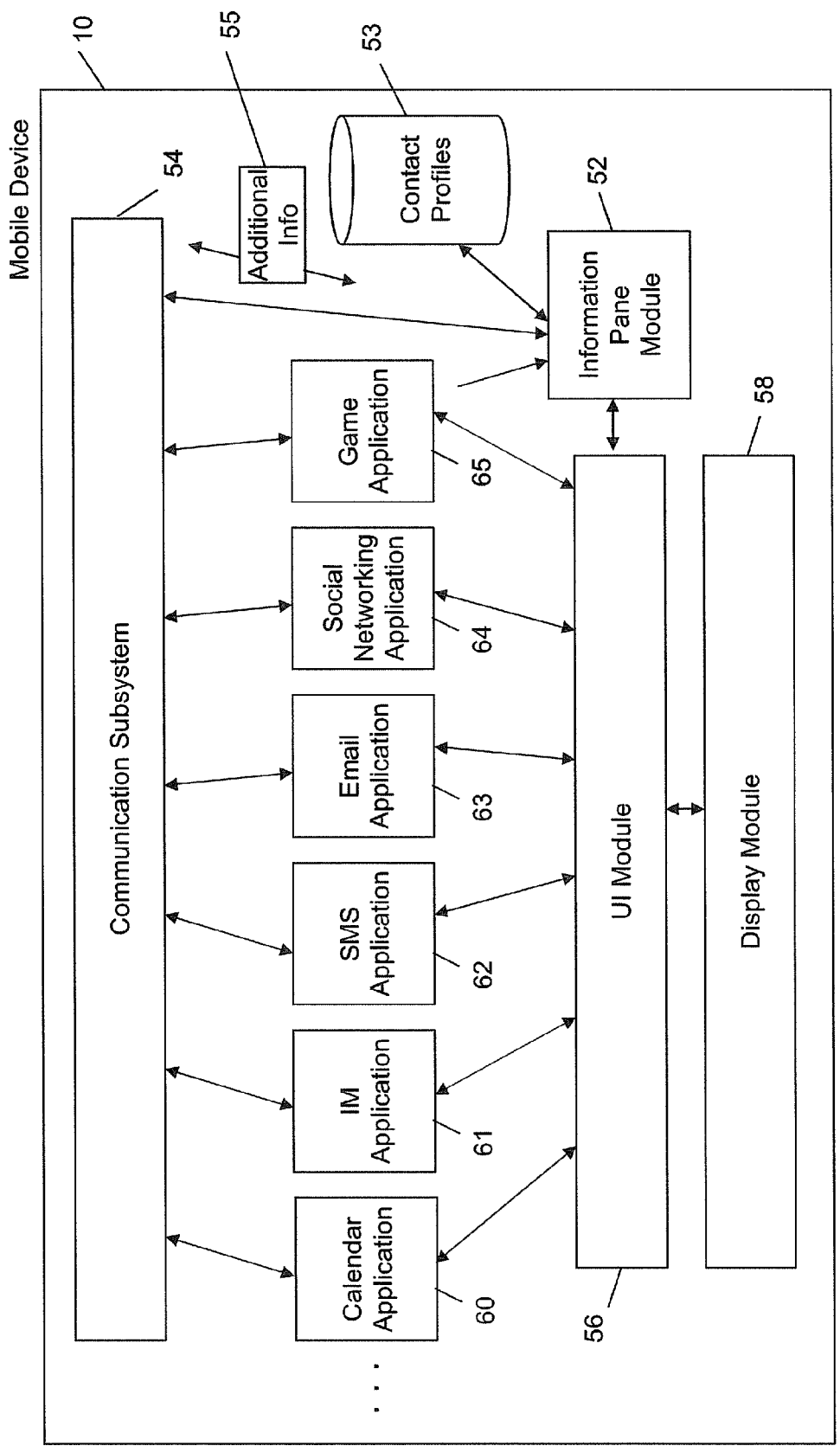
FIG. 5 is a block diagram illustrating an example configuration for a mobile device including a data tagging module.

The P2P system 18 can be implemented using a router-based communication infrastructure, such as one that provides email, SMS, voice, Internet and other communications. Particularly suitable for hosting a P2P messaging router, is a wireless router or server used in systems such as those that provide push-based communication services. In FIG. 2, the wireless infrastructure 16' facilitates P2P communications such as instant messaging between mobile devices 10. P2P messaging, such as IMing, is provided by an associated application stored on each mobile device 10, e.g., an IM application 61 as shown in FIG. 5, which can be initiated, for example, by highlighting and selecting an icon from a display as is well known in the art. The P2P system 18 routes messages between the mobile devices 10 according to the P2P protocol being used. For example, the P2P protocol may define a particular way in which to conduct IM or other types of messaging.

In general, in a P2P protocol, the sender of the P2P message 32 knows the source address of the intended recipient, e.g., a PIN. Knowledge of the source address may be established when the two devices request to add each other to their respective contact or buddy lists. A particular mobile device 10 can communicate directly with various other mobile devices 10 through the P2P system 18 without requiring a dedicated server for facilitating communications. In other words, the P2P system 18 enables the mobile devices 10 to communicate with each other directly over the wireless infrastructure 16' in accordance with the P2P protocol.

When conducting a P2P session according to the example shown in FIG. 2, the mobile devices 10 can communicate directly with the wireless infrastructure 16' in a client based exchange where, as noted above, an intermediate server is not required. A P2P message 32 sent by one mobile device 10 is received by the wireless infrastructure 16', which obtains the source address for the intended recipient (or recipients) from information associated with the message 32 (e.g., a data log) or from the message 32 itself. Upon obtaining the recipient's address according to the P2P protocol, the wireless infrastructure 16' then routes the message 32 to the recipient associated with the mobile device 10 having such address (or recipients having respective addresses). The wireless infrastructure 16' typically also provides a delivery confirmation to the original sender, which may or may not be displayed to the user. The destination device can also provide such delivery information. The wireless infrastructure 16' may be capable of routing P2P messages 32 reliably as well as being capable of holding onto the P2P messages 32 until they are successfully delivered. Alternatively, if delivery cannot be made after a certain timeout period, the wireless infrastructure 16' may provide a response indicating a failed delivery. The wireless infrastructure 16' may choose to expire or delete a message 32 if a certain waiting period lapses.

Turning now to FIG. 5, an example configuration for a mobile device 10 is shown. In this example, a communication subsystem 54 is provided in order to enable the mobile device 10 to access communication networks such as the wireless network 12 shown in FIGS. 1 and 2. Various applications are illustrated in FIG. 5, and such applications may be operable on the mobile device 10 to access the communication subsystem 54 in order to participate in sending and/or receiving data 14, such as in a data communication. It can be appreciated that the example applications shown in FIG. 5 are for illustrative purposes only and should not be considered exhaustive. The example applications shown in FIG. 5 include a calendar application 60, an IM application 61, an SMS application 62, an email application 63, a social networking application 64, and a game application 65. The applications 60-65 may also access a UI module 56 for providing UI data on a display of the mobile device 10 using a display module 58.

To exchange information in addition to that exchanged in communications using the applications 60-65, a tab 76 (see also FIG. 6) may be provided in a UI for the application 60-65. Such additional information 55 can be represented by one or more items 84 provided in an information pane 82 (see also FIG. 11) accessible by selecting and enlarging the tab 76. In the example embodiment shown in FIG. 5, an information pane module 52 is provided, which can be used to obtain and store additional information 55 received from or on behalf of a contact, and obtain and send additional information 55 related to a user of the mobile device 10. As will be shown by way of example below, the additional information 55 represented by items 84 in the information pane 82 may be made available in various ways, such as by incorporating the additional information 55 in a contact profile 53 for the associated contact. It can be appreciated that the contact profiles database 53 shown in FIG. 5 may contain general profiles (e.g., for a contacts application), specific profiles (e.g., IM profiles), or both. It can also be appreciated that the information pane module 52 may be operable to obtain the additional information 55 from the applications 60-65 themselves and from other sources on or available to the mobile device 10.

The additional information 55 can include any event, update, or related information that provides context regarding the activities, status, state, location, environment, etc. of a particular contact. For example, the additional information 55 can include, relate to, or represent a social networking update, provide a link or advertisement associated with information the contact is currently viewing, browsing, or listening to on their mobile device 10, provide location based information such as weather and news, provide photos, videos, documents or other attachments sent by the contact, etc. As such, it can be appreciated that the information pane 82 can be used to provide various items that represent or contain various types of additional information 55 related to the contact with which the user is communicating.

Figure 6:
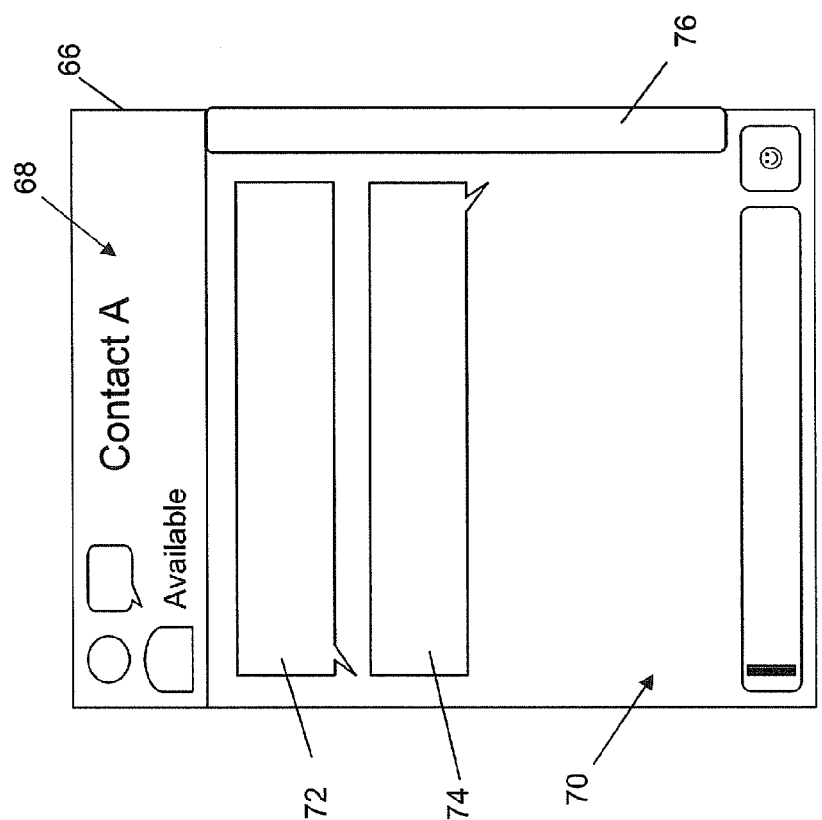
FIG. 6 is a screen shot of an example IM conversation user interface (UI) including an information tab in a conversation portion of the UI.

FIG. 6 illustrates an example message exchange UI, which is an IM conversation UI 66 having existing content, including a banner portion 68 and a conversation history portion 70. The conversation history portion 70 includes, in this example, an outgoing message 72 to, and an incoming message 74 from, Contact A. The conversation history portion 70 includes or is adjacent to an information tab 76. It can be seen in FIG. 6 that the information tab 76 is displayed in such a way that it does not obstruct or degrade from the display space made available to the other components of the IM conversation UI 66, the conversation history portion 70 in particular, in this example. It can be appreciated that the information tab 76 may also be displayed in other locations within the IM conversation UI 66 and FIG. 6 provides only one illustrative example. For example, the information tab 76 may instead be along the left, top, or bottom edge of the conversation history portion 70 or, as illustrated below, be incorporated in the banner portion 68.

To provide a notification of new information items 84 associated with Contact A, the information tab 76 can be visually modified or have a distinguishable alert associated with receipt of the new items (e.g., an audible tone, flashing light, vibration, etc.). It can also be appreciated that the information tab 76 can be concealed or otherwise "made invisible" until receipt of new additional information 55 for Contact A, and therefore the presence of the information tab 76 in the IM conversation UI 66 may itself provide notification of the receipt of new additional information 55.

Figure 7:
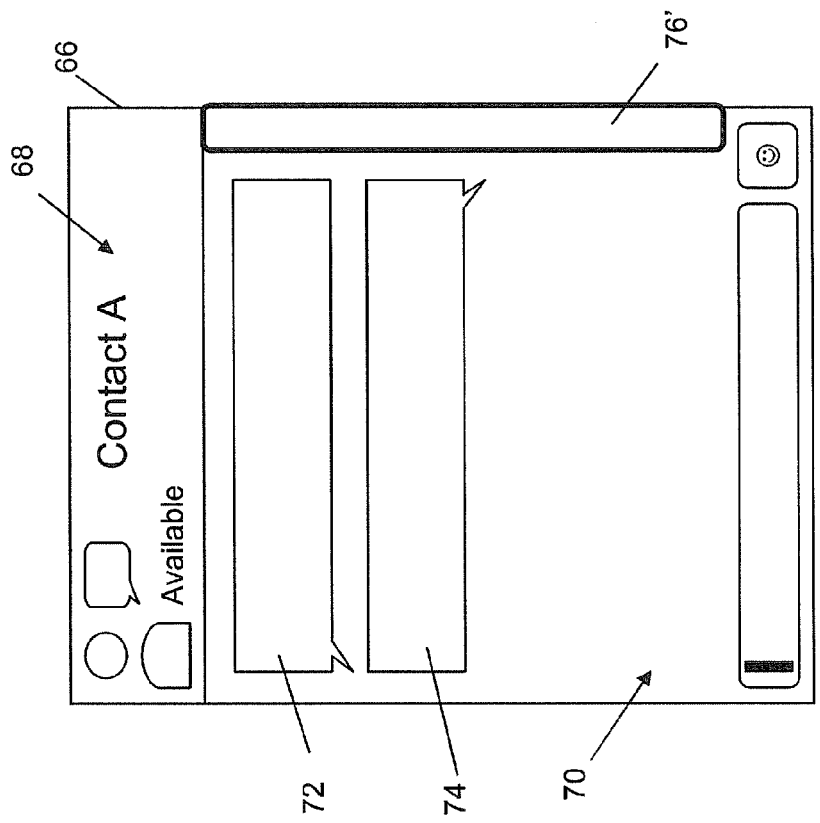
FIG. 7 is a screen shot of an example IM conversation UI including the information tab illustrated in FIG. 6 modified to provide a notification of new content.

FIG. 7 illustrates an example wherein a modified information tab 76' is displayed to indicate the receipt of new additional information 55. In the example embodiment shown in FIG. 7, the modified information tab 76' includes a darkened border to distinguish the modified information tab 76' from the regular information tab 76. The modified information tab 76' can replace a regular information tab 76 for a predetermined amount of time before reverting to the regular information tab 76, or may persist until an input is detected (e.g., selection of the highlighted information tab 76'). It can be appreciated that in examples wherein the information tab 76 is displayed only when new additional information 55 is obtained, the information tab 76 may similarly be displayed for a predetermined amount of time, or persist until detecting an input.

Figure 9:
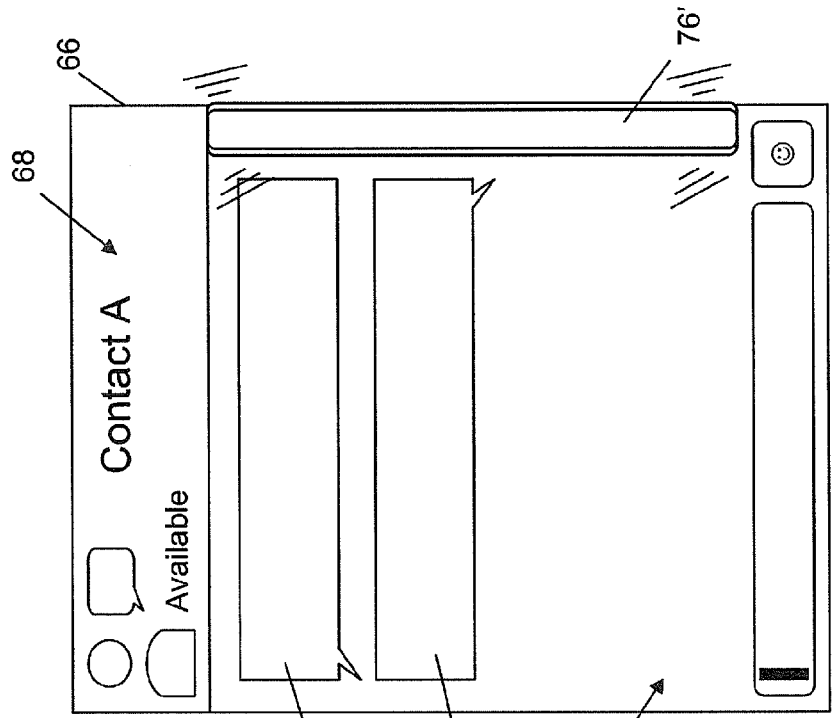
FIG. 9 is a screen shot of an example IM conversation UI including the information tab illustrated in FIG. 6 modified to provide a notification of new content.
Figure 8:
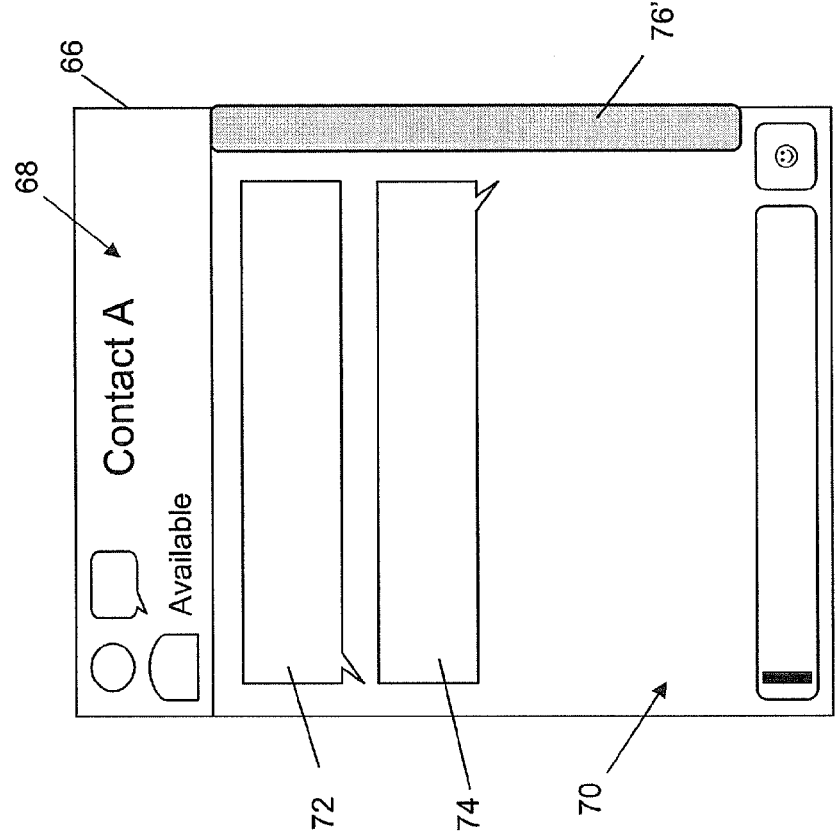
FIG. 8 is a screen shot of an example IM conversation UI including the information tab illustrated in FIG. 6 modified to provide a notification of new content.

FIG. 8 illustrates an example wherein the modified information tab 76' comprises a different color than the regular information tab 76. FIG. 9 illustrates an example embodiment wherein the modified information tab 76' comprises a movement (e.g., a "wiggle" or other animation) of the regular information tab 76 (as illustrated in FIG. 9 using the movement lines). In the example shown in FIG. 9, it can be appreciated that such movement can be performed for a predetermined amount of time before reverting to the regular information tab 76 or to another version of the modified information tab 76' (e.g., to include a darkened border, shading, etc.).

Turning now to FIGS. 10 and 11, an example illustrating an enlargement of the information tab 76 to reveal the information pane 82 is shown. Enlarging the information tab 76 can enable access to data items 84 associated with the new additional information 55. In this example embodiment, a "touch and drag" operation 78 is used to simulate "pulling" the information tab 76 away from the edge of the screen to reveal the information pane 82. FIG. 10 illustrates an intermediate tab 80, which gradually enlarges as the drag operation continues until the intermediate tab 80 becomes a predetermined size, at which time the information pane 82 locks into place and displays the various items 84 related to Contact A. It can be seen in FIGS. 10 and 11 that the enlargement of the information tab 76 and the intermediate tab 80 can coincide with a resizing of the conversation history portion 70 of the IM conversation UI 66, in order to not disrupt or conceal the messages 72, 74. In this way, the information pane 82 can not only be used to quickly view the items 84 while exchanging messages with Contact A, but the information pane 82 can be kept in view during the conversation to stimulate conversation and provide ongoing context with respect to Contact A. Moreover, by maintaining the information pane 82 alongside the IM conversation history portion 70 as shown in FIG. 11, new additional information 55 can be continually updated as the new additional information 55 becomes available. Alternatively, upon enlarging the information tab 76, the information pane 82 may overlap at least part of the conversation history portion 70, temporarily obstructing viewing of the conversation history portion 70.

As shown in the example of FIG. 11, a selectable option 86 may also be displayed in the information pane 82 to initiate the display of a profile or other separate screen which contains the additional information 55 represented by the items 84. In this way, selection of the option 86 enables all additional information 55 to be displayed whereas selection of an individual item 84 enables a portion of the additional information 55 to be provided, e.g., separately, using another application, or otherwise. For example, an item 84 may be used to indicate the nature of a social networking update wherein selection of the update itself launches a UI for the social networking application 64. The option 86 may be used to display a customized application that is used to display the additional information 55 or to launch a contact profile 53 or other screen or UI related to the associated contact, the contact profile 53 or other screen or UI including or providing access to the additional information 55.

As will be discussed further below, the information pane 82 can also provide a parallel portal for sending and receiving the additional information 55, e.g., during a conversation. For example, a thumbnail of a picture may be displayed as one of the items 84 in the information pane 82, whereupon selection of the thumbnail initiates a transfer of the picture to the mobile device 10. It can be appreciated that such transfers can be initiated both manually by the users and automatically by the mobile devices 10. For example, the information pane module 52 can be operable to detect content being viewed using a browser application and automatically forward a representative image, a link, or any portion of content being viewed to provide context with respect to how the user is currently engaged with the mobile device 10. In this way, the additional information 55 can provide an indication of what may be of interest to a contact or stimulate further conversation.

Figure 13:
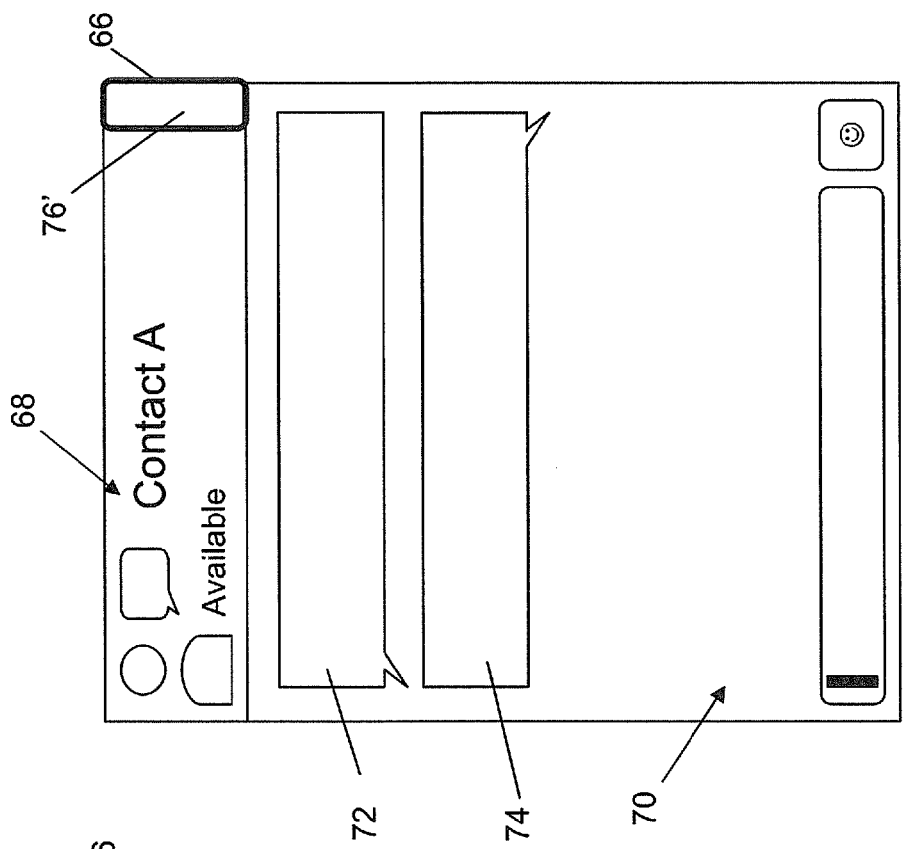
FIG. 13 is a screen shot of an example IM conversation UI including the information tab illustrated in FIG. 12 modified to provide a notification of new content.
Figure 12:
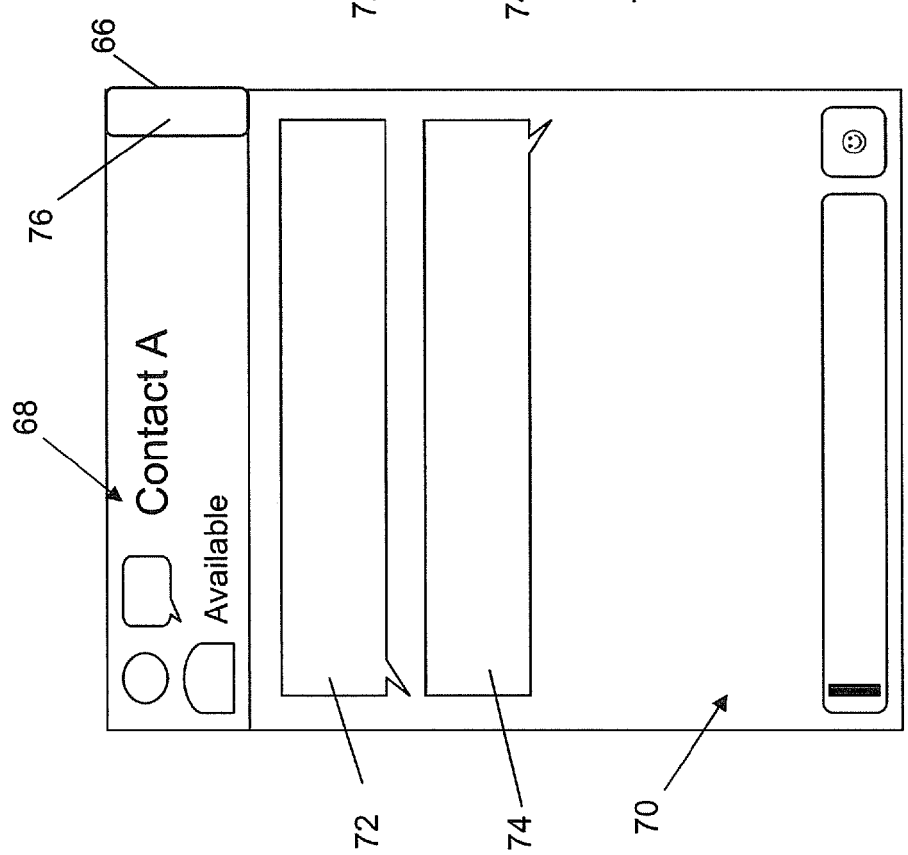
FIG. 12 is a screen shot of an example IM conversation UI including an information tab in a banner portion of the UI.
Figure 15:
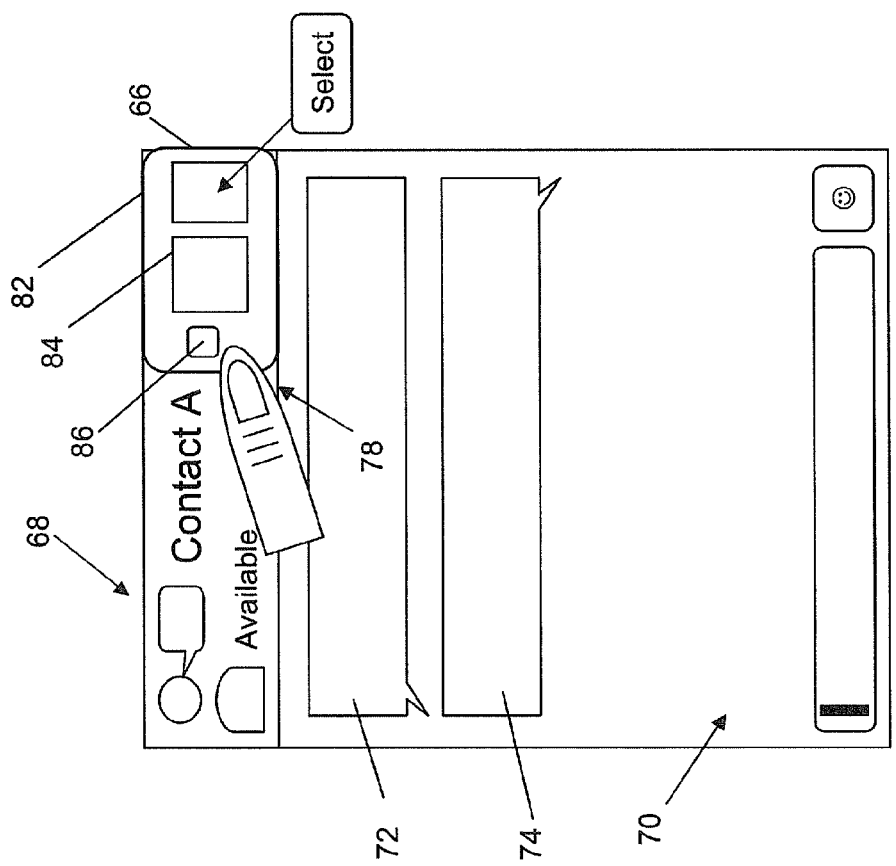
FIG. 15 is a screen shot of an example IM conversation UI including an information pane displayed subsequent to the drag operation illustrated in FIG. 14.
Figure 14:
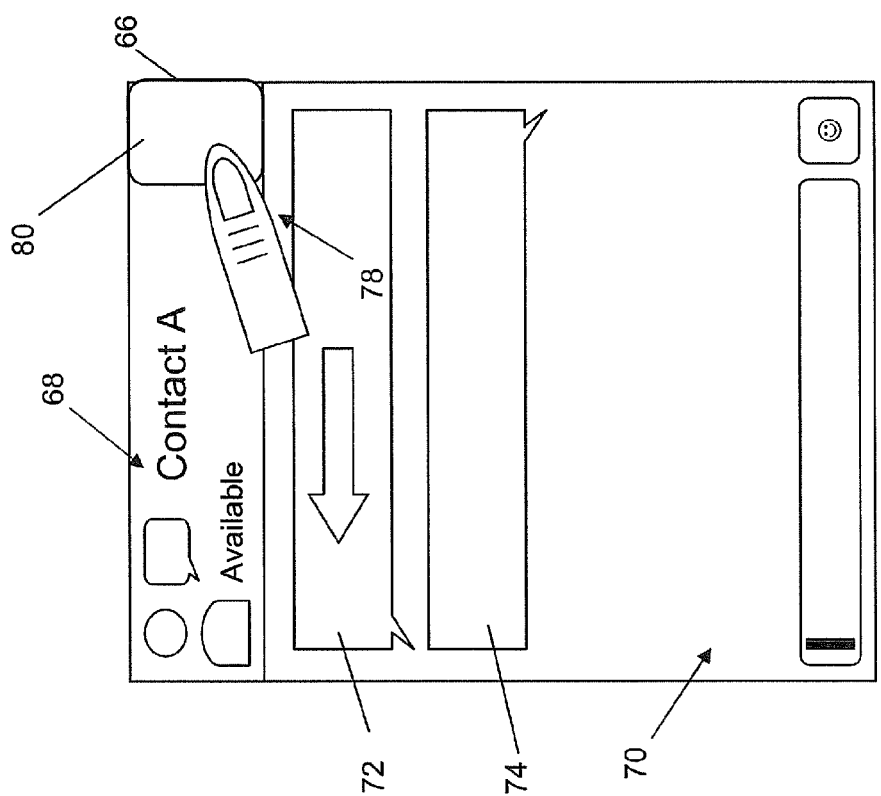
FIG. 14 is a screen shot of an example IM conversation UI including the information tab illustrated in FIG. 12 during a drag operation.

FIGS. 12 to 15 illustrate another example, wherein the information tab 76 and information pane 82 are displayed in the banner portion 68 of the IM conversation UI 66. As illustrated in FIG. 13, a modified information tab 76' may be used to provide notification of new additional information 55, and as illustrated in FIG. 14, selecting and dragging the information tab 76 can initiate display of an intermediate tab 80 prior to revealing the information pane 82 in the banner portion 68. It can be appreciated that, similar to the example embodiment shown in FIGS. 7 to 11, the contents of the banner portion 68 may be resized and shifted such that the information pane 82 does not obstruct such contents (e.g., contact name, availability information, etc.), or the information pane 82 may temporarily overlap an area of the banner portion 68. In the example shown in FIG. 15, it can be seen that a selectable option 86 can be provided, similar to the embodiment shown in FIGS. 7 to 11 for initiating the display of a separate screen including the additional information 55. Similarly, a number of items 84 representing portions of the additional information 55 can also be displayed in a banner-situated information pane 82 and selection of a particular item 84 can initiate the display of the additional information 55 represented by the item 84 and/or an application UI including or associated with the item 84 and additional information 55.

Figure 19:
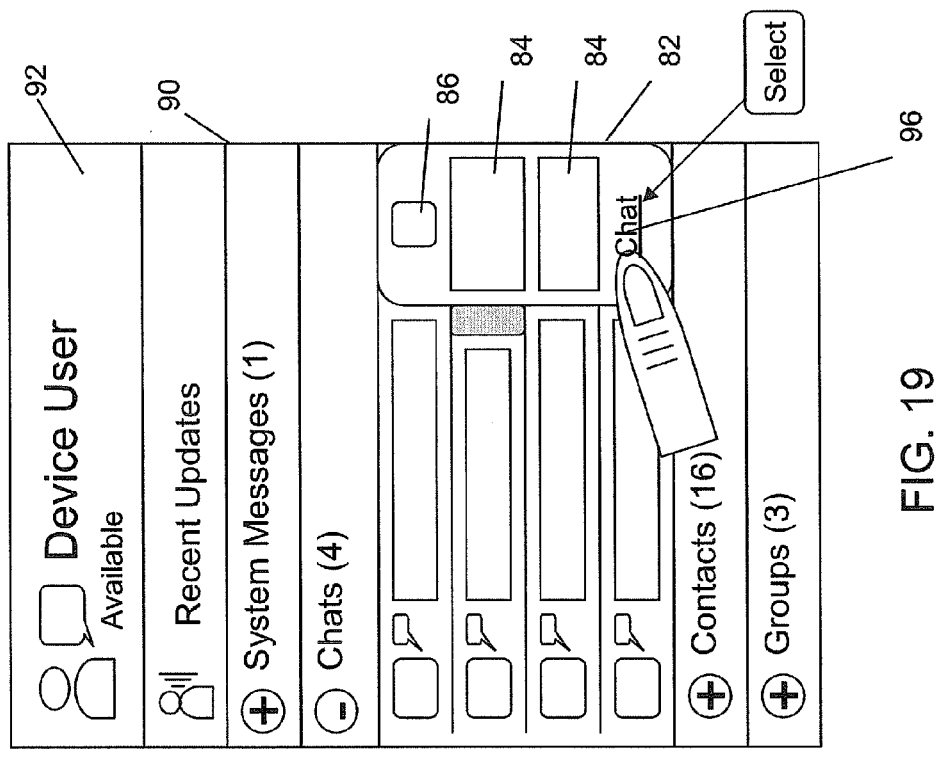
FIG. 19 is a screen shot of an example IM list view UI including an information pane displayed subsequent to the drag operation illustrated in FIG. 18.
Figure 18:
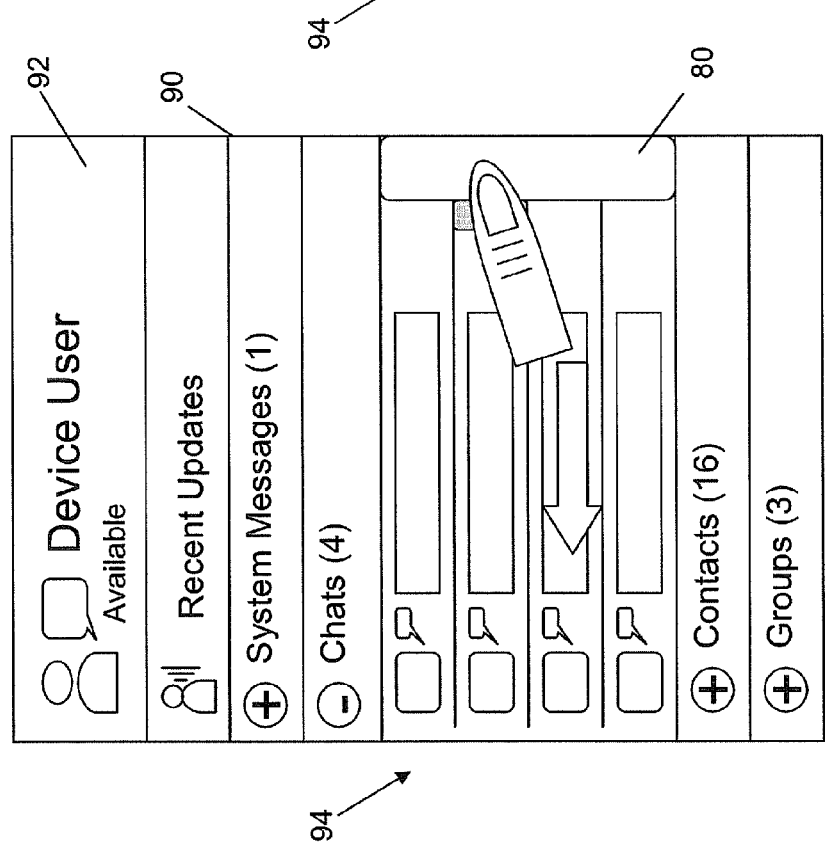
FIG. 18 is a screen shot of an example IM list view UI including the information tab illustrated in FIG. 17 during the drag operation.

Turning now to FIGS. 16 to 19, in another example, one or more information tabs 76 may be displayed in an IM list view UI 90 to enable additional information 55 associated with any one of a plurality of contacts to be made available in a single location. In the example shown, the IM list view UI 90 includes a banner portion 92 related to the user of the mobile device 10 and, among other things, a list of chats 94 associated with various contacts. As shown in FIG. 16, when new additional information 55 is received for a particular contact, a notification of the new additional information 55 can be provided in association with the particular contact, e.g., by displaying a partial information tab 76 adjacent a contact list item, or displaying a modified information tab 76' to distinguish that information tab 76' from others that may also be displayed at the same time. By selecting the information tab 76 or modified information tab 76', a larger intermediate tab 80 can be displayed to provide a larger area for dragging to reveal the information pane 82 as shown in FIGS. 18 and 19. Similar to the examples above, a selectable option 86 can be provided to enable a separate screen including all or at least a number of portions of the additional information 55 to be displayed, in addition to a number of items 84 representing portions of the additional information 55 being displayed. Also shown in FIG. 19 is a Chat option 96 or link that may be selected in order to navigate into a chat with the particular contact (e.g., as shown in FIGS. 6 to 15). In this way, the contextual or otherwise relevant additional information 55 can lend itself to initiating new conversations or resuming idle conversations by providing an item 84 that sparks an interest in the contact. It can be appreciated that when displaying the IM conversation UI 66 after detecting selection of the Chat option 96, either the information tab 76 or the information pane 82 can be displayed along with the new or existing chat with the contact. It can also be appreciated that similar to the above-described examples, the list of chats 94 can be resized as the information tab 76 is enlarged from an intermediate tab 80 to the information pane 82 so as to not obstruct the information provided in each list item.

As discussed above, selection of, for example, the selectable option 86, invokes a separate screen including the addition information 55 to be displayed to provide access to at least a plurality of the items 84. FIG. 20 illustrates an IM profile UI 98 which includes, in addition to IM related information for the associated contact, an additional information portion 100 which includes information items 102 listed or otherwise provided therein. It can be appreciated that the portion 100 can be scrollable as shown or utilize various other mechanisms to enable the additional information 55 to be displayed in a convenient manner. FIG. 21 illustrates a contact profile UI 104 for Contact A that may also be configured to display an additional information portion 100 including information items 102. FIG. 22 illustrates an example activity view UI 106 for Contact A, which provides a customized UI for displaying the additional information items 102. It can be appreciated that the activity view UI 106 can generally represent any application UI or other UI that has been customized or is otherwise configured to display the additional information 55.

Figures 24, 25:
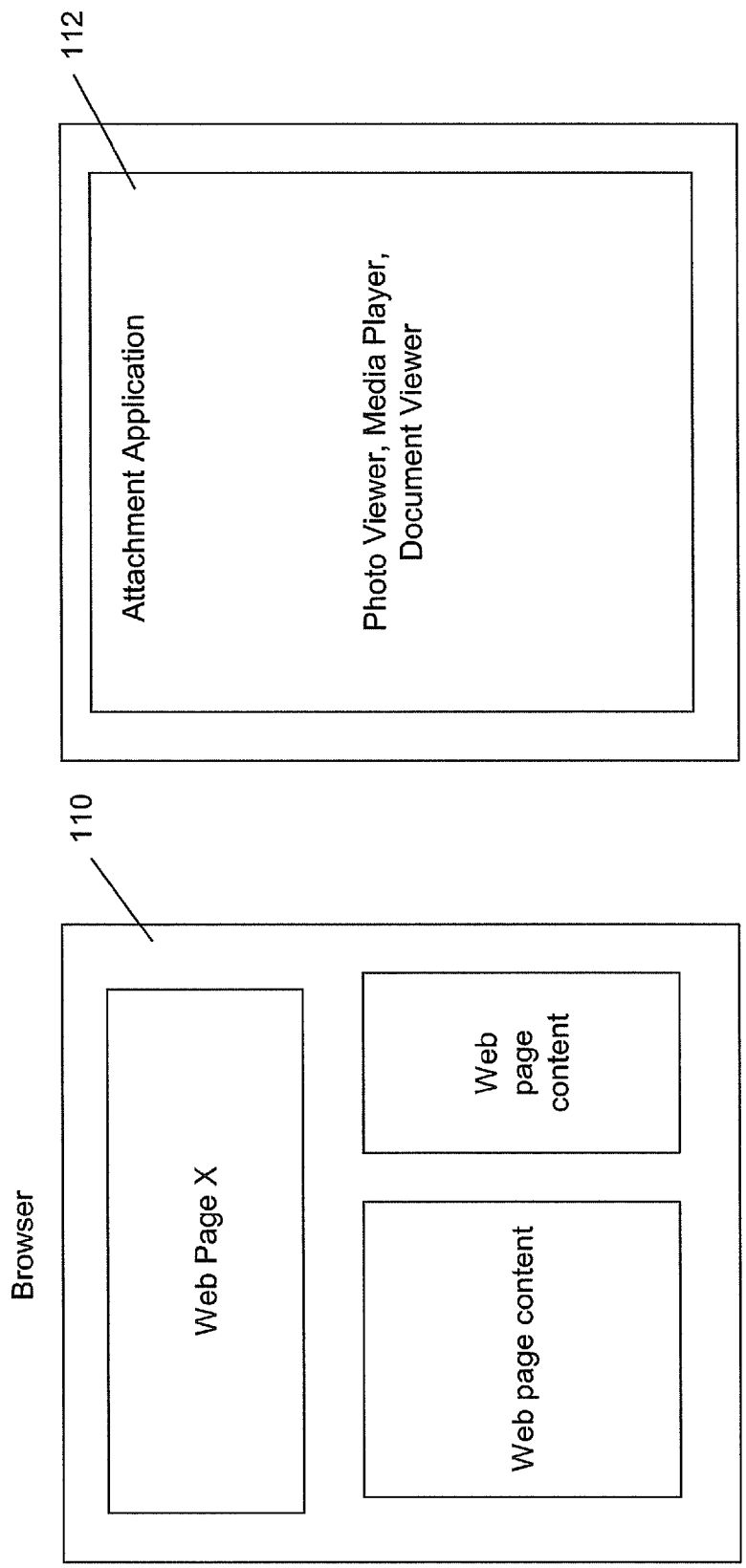
FIG. 24 is a screen shot of an example web browser UI.
FIG. 25 is a screen shot of an example attachment application UI.

FIG. 23 illustrates a social networking page UI 108 for Contact A, which may be displayed upon detecting selection of an item 84 from the information pane 82, an information item 102 from an activity view UI 106 or profile UI 98, 104, the selectable option 86 (e.g., if all items 84 are related to the same application type), etc. The items 84, 102 may represent a larger set of additional information 55 (e.g., thumbnail of an image, icon representing a social networking update, etc.), or may provide a link to additional information 55. For example, as shown in FIG. 24, selection of an item 84, 102 can initiate the display of web page content via a web browser UI 110. Similarly, the item 84, 102 may provide a link for opening an attachment such as a media file, document, etc. which, when selected initiates the display of an attachment application UI 112 as shown in FIG. 25, e.g., a photo viewer, media player, document viewer such as a spreadsheet or word processing application, etc.

Selection of an item 84, 102 can also initiate the display of any other application in order to direct the user to particular additional information as shown in FIG. 26. In FIG. 26, a general application UI 114 is shown. In an example, a game invite, calendar invite, list item or other planner type item can be represented by an item 84, 102 which, when selected, initiates the display of an associated application UI 114, e.g., to begin playing a game, to view a calendar comprising the calendar appointment, etc.

Although the above examples illustrate the display of an information tab 76 and information pane 82 in association with an IM conversation UI 66, it can be appreciated that the information tab 76 and pane 82 can be displayed with existing content in any other message exchange UI. For example, as shown in FIG. 27, an SMS thread UI 116 including a previous message 120 and a reply message 118 can be configured to include the information tab 76, in a manner similar to the IM conversation UI 66. Similarly, as shown in FIG. 28, an email thread UI 122 including a previous message 126 and reply 124 can be configured to include the information tab 76 to enable a touch and drag operation 78 to be used to enlarge the information tab 76 to reveal the items 84 in the information pane 82. It can also be appreciated that the information tab 76 can also be displayed in other application UIs that can be associated with a contact. For example, as shown in FIG. 29, a game application UI 128 can be configured to include the information tab 76 to enable a touch and drag operation 78 to be used to enlarge the information tab 76 to reveal the items 84 in the information pane 82 during game play.

Figure 30:
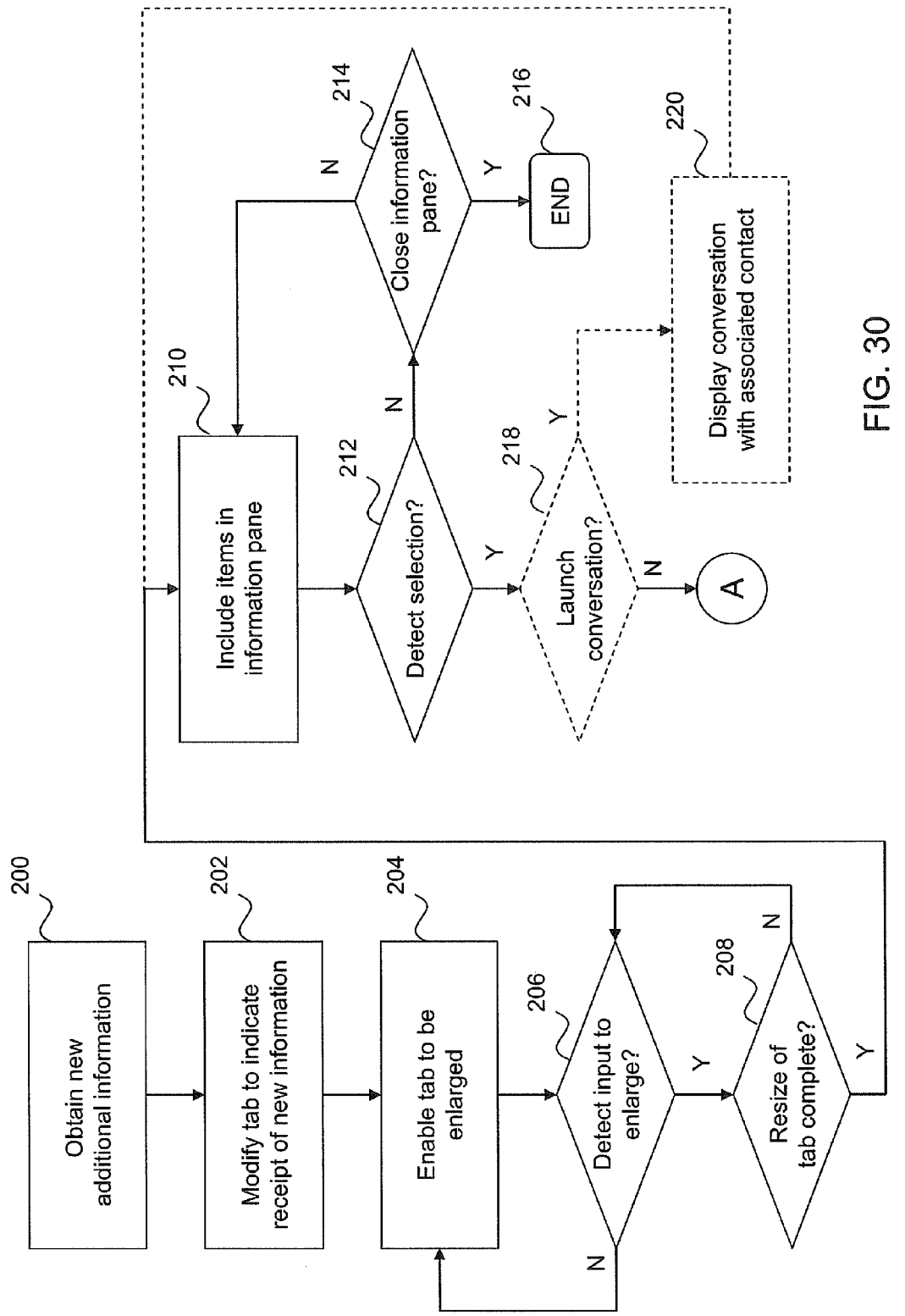
FIG. 30 is a flow chart illustrating an example set of computer executable operations that may be performed in modifying an information tab to notify of new information, enabling the information tab to be enlarged to provide an information pane, and enabling selection of items in the information pane.

FIG. 30 illustrates an example set of computer executable operations that may be performed in modifying an information tab 76 to provide notification of new additional information 55, enabling the information tab 76 to be enlarged to provide an information pane 82, and enabling selection of items 84 in the information pane 82. New additional information 55 is obtained by the information pane module 52 at 200. For example, the new additional information 55 may be received in a message or other packet of data sent by a server or system (e.g., P2P system 18) or directly from a particular contact. The information tab 76 may then be modified or initially presented at 202 to indicate receipt of or otherwise the presence of new additional information 55. The information pane module 52 may then enable the information tab 76 to be enlarged at 204. It can be appreciated that the information tab 76 may also be able to be enlarged at other times. After detecting an input to enlarge the information tab 76 at 206 (e.g., a touch and drag operation 78), the information pane module 52 may then determine at 208 when the resize of the information tab 76 has been completed (e.g., when the intermediate tab 80 has been enlarged to a predetermined width enabling the items 84 to be populated in the information pane 82). Once the resizing of the information tab 76 has been completed and the information pane 82 is displayed, the items 84 can be included in the information pane 82 at 210. The information pane module 52 may then provide the items 84 until detecting selection of an option associated with the information pane 82 at 212. If selection is not detected at 212, the information pane module 52 also determines at 214, whether or not the information pane 82 should be closed. For example, an oppositely directed touch and drag operation 78 may be used to "slide" the information pane 82 back towards the edge of the UI thus returning to a state wherein the information tab 76 is instead displayed. The information pane 82 can also be operable to close after a predetermined amount of time has elapsed so as to only consume a portion of the UI for a brief period of time. If the information pane 82 is closed at 214, the operations of FIG. 30 end at 216.

Upon detecting selection of an option associated with the information pane 82 at 212, if the Chat option 96 is available (e.g., wherein the information pane 82 has been displayed in the IM list view UI 90), the information pane module 52 determines at 218 if a conversation is to be launched. If a conversation is to be launched, an IM conversation UI 66 with the associated contact is displayed at 220. It can be appreciated that, as discussed above, navigation into a conversation can include displaying the items 84 in the information pane 82 along with the conversation history portion 70.

Figure 31:
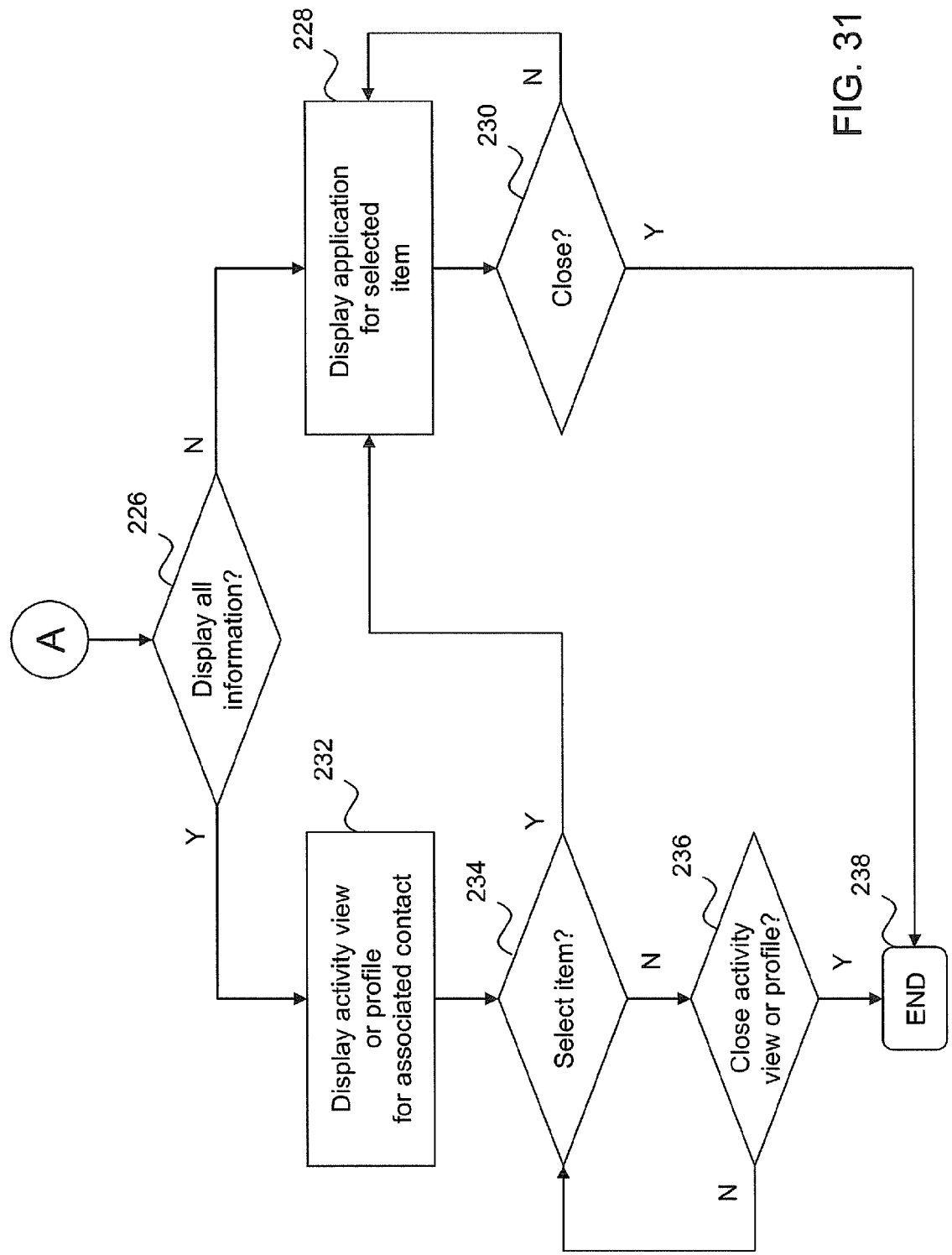
FIG. 31 is a flow chart illustrating an example set of computer executable operations that may be performed in displaying activity information upon detecting a selection in association with the information pane.

If selection of an option associated with the information pane 82 is not selection of the Chat option 96, the operations may proceed to A shown in FIG. 31. At 226, the information pane module 52 determines if all additional information 55 is to be displayed, e.g., if the selectable option 86 has been selected. If not, an application for a selected item 84 may be displayed at 228 (e.g., by launching a photo viewer, web browser, media player, document editor, social networking UI page UI 108, calendar, game, etc.). The mobile device 10 may then determine at 230 when to close the application or attachment. If all of the additional information 55 is to be displayed (e.g., by detecting selection of the selectable option 86), an activity view UI 106, profile UI 98, 104, etc. for the associated contact is displayed at 232. From the UI displaying the additional information 55, the information pane module 52 may then determine at 234, whether or not an item 102 has been selected. If so, an application for the selected item 102 may be displayed at 228 as discussed above. If an item 102 has not been selected, the information pane module 52 can determine whether or not to close the activity view UI 106 or profile UI 98, 104 at 236. If the UI is to be closed, the operations shown in FIG. 31 end at 238.

Figure 32:
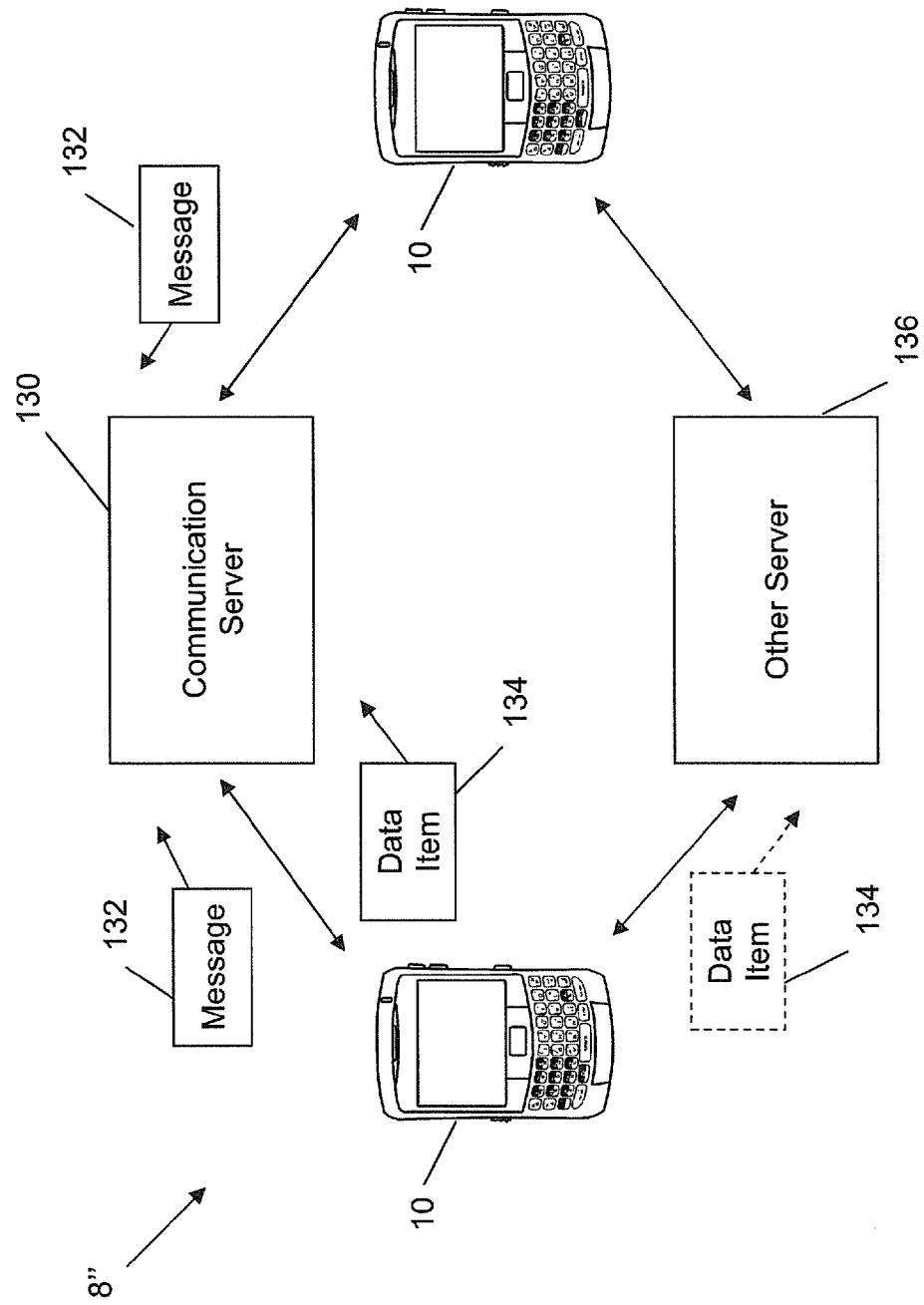
FIG. 32 is a block diagram of an example communication system enabling data items to be sent separately from communication messages.

As discussed above, the information pane 82 may also provide a parallel port or channel for exchanging data items 134 between mobile devices 10. FIG. 32 illustrates an example communication system 8" in which messages 132 are exchanged via a communication server 130 (e.g., P2P system 18), and such data items 134 (i.e. additional information 55) are exchanged separately from the flow of messages 132, either through the same communication server 130 or another server 136. For example, the communication server 130 may represent an SMSC for exchanging SMS messages. However, in order to enable additional information 55 to be provided via the information pane 82, the other server 136 can be used to offload bandwidth from the communication server 130, avoid excess data charges, and/or exchange data items 134 not supported by the protocol used by the communication server 130. In this way, the information pane 82 can be used as both a display portal and a delivery portal.

Figure 33:
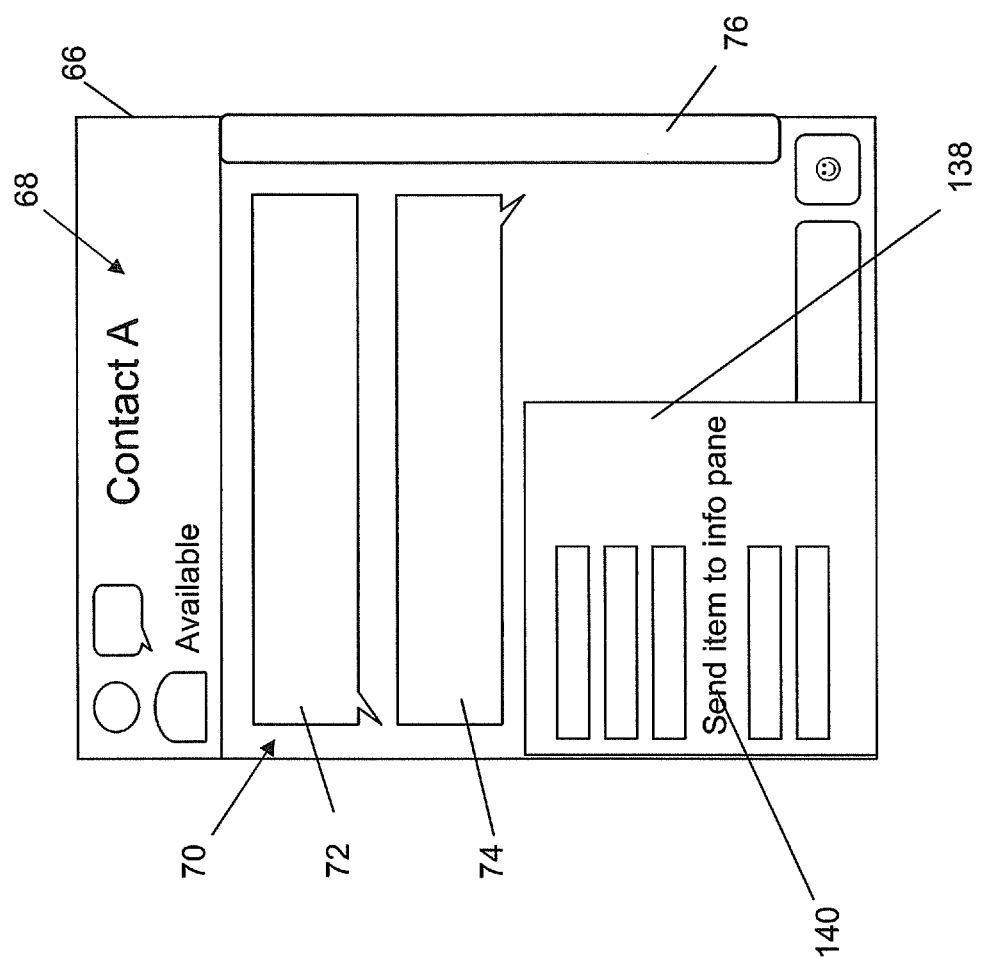
FIG. 33 is a screen shot of an example IM conversation UI illustrating a menu including an option to send a data item to an information pane for a contact.

FIG. 33 illustrates an example menu 138 that may be invoked in an IM conversation UI 66 for providing a Send item to info pane option 140 for initiating delivery of an item using the information pane 82. By selecting the option 140, a selected one or more items or representations thereof, may be sent to Contact A such that the items 84 are displayed in the information pane 84 rather than as attachments in messages or otherwise included in the conversation or other message exchange.

Figure 34:
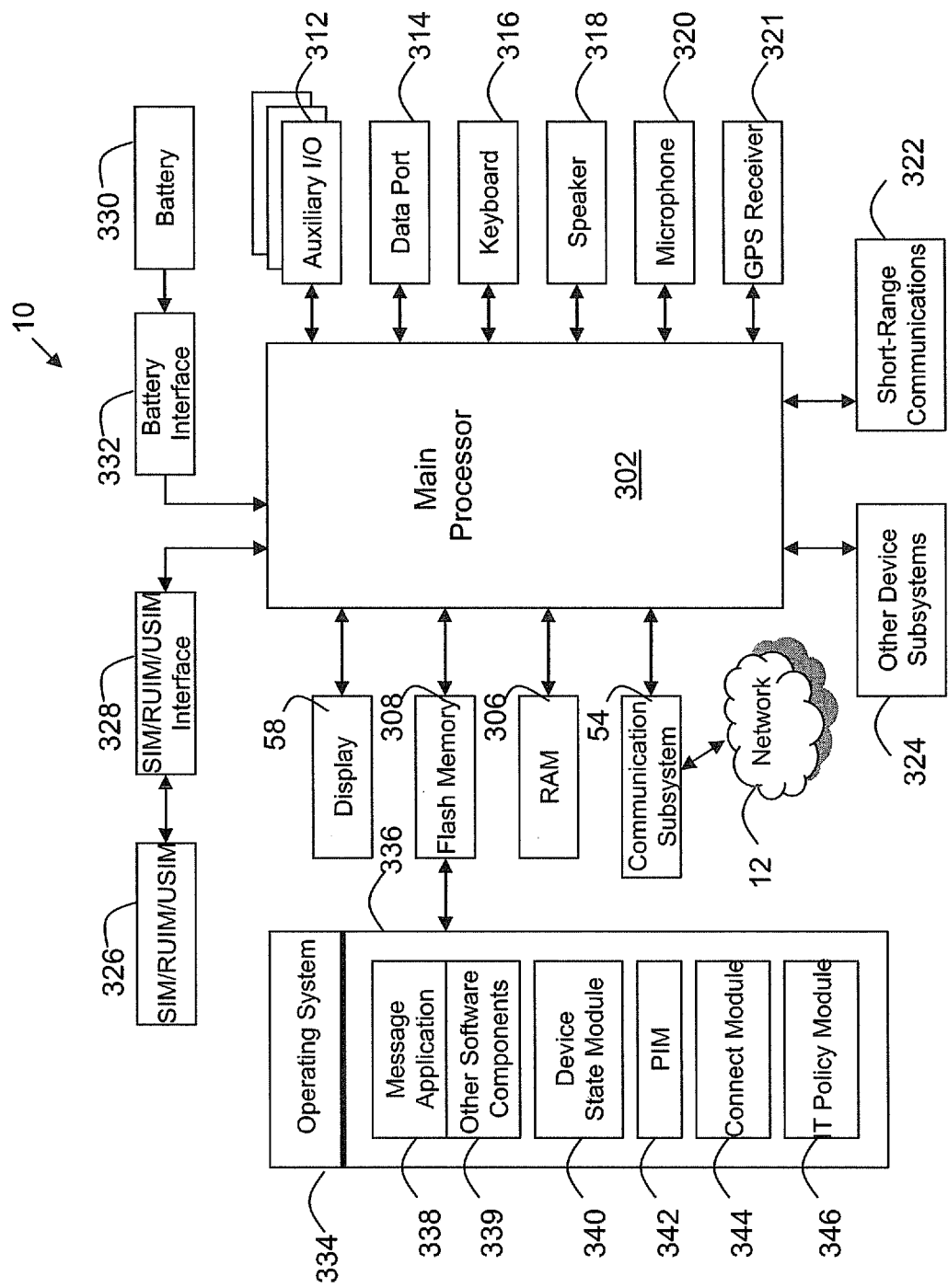
FIG. 34 is a block diagram of an example configuration for a mobile device.

Referring now to FIG. 34, shown therein is a block diagram of an example mobile device 10. The mobile device 10 includes a number of components such as a main processor 302 that controls the overall operation of the mobile device 10. Communication functions, including data and voice communications, are performed through a communication subsystem 54. The communication subsystem 54 receives messages from and sends messages to a wireless network 12. In this example mobile device 10, the communication subsystem 54 is configured in accordance with the Global System for Mobile Communication (GSM) and General Packet Radio Services (GPRS) standards. The GSM/GPRS wireless network is used worldwide and it is expected that these standards will be superseded eventually by 3G and 4G networks such as EDGE, UMTS and HSDPA, LTE, Wi-Max etc. New standards are still being defined, but it is believed that they will have similarities to the network behaviour described herein, and it will also be understood by persons skilled in the art that the examples described herein are intended to use any other suitable standards that are developed in the future. The wireless link connecting the communication subsystem 54 with the wireless network 12 represents one or more different Radio Frequency (RF) channels, operating according to defined protocols specified for GSM/GPRS communications. With newer network protocols, these channels are capable of supporting both circuit switched voice communications and packet switched data communications.

The main processor 302 also interacts with additional subsystems such as a Random Access Memory (RAM) 306, a flash memory 308, a display 58, an auxiliary input/output (I/O) subsystem 312, a data port 314, a keyboard 316, a speaker 318, a microphone 320, global positioning system (GPS) receiver 321, short-range communications subsystem 322 and other device subsystems 324.

Some of the subsystems of the mobile device 10 perform communication-related functions, whereas other subsystems may provide "resident" or on-device functions. By way of example, the display 58 and the keyboard 316 may be used for both communication-related functions, such as entering a text message for transmission over the network 12, and device-resident functions such as a calculator or task list.

The mobile device 10 can send and receive communication signals over the wireless network 12 after required network registration or activation procedures have been completed. Network access is associated with a subscriber or user of the mobile device 10. To identify a subscriber, the mobile device 10 may use a subscriber module. Examples of such subscriber modules include a Subscriber Identity Module (SIM) developed for GSM networks, a Removable User Identity Module (RUIM) developed for CDMA networks and a Universal Subscriber Identity Module (USIM) developed for 3G networks such as UMTS. In the example shown, a SIM/RUIM/USIM 326 is to be inserted into a SIM/RUIM/USIM interface 328 in order to communicate with a network. The SIM/RUIM/USIM component 326 is one type of a conventional "smart card" that can be used to identify a subscriber of the mobile device 10 and to personalize the mobile device 10, among other things. Without the SIM/RUIM/USIM component 326, the mobile device 10 may not be fully operational for communication with the wireless network 12. By inserting the SIM/RUIM/USIM 326 into the SIM/RUIM/USIM interface 328, a subscriber can access all subscribed services. Services may include: web browsing and messaging such as e-mail, voice mail, SMS, and MMS. More advanced services may include: point of sale, field service and sales force automation. The SIM/RUIM/USIM 326 includes a processor and memory for storing information. Once the SIM/RUIM/USIM 326 is inserted into the SIM/RUIM/USIM interface 328, it is coupled to the main processor 302. In order to identify the subscriber, the SIM/RUIM/USIM 326 can include some user parameters such as an International Mobile Subscriber Identity (IMSI). An advantage of using the SIM/RUIM/USIM 326 is that a subscriber is not necessarily bound by any single physical mobile device. The SIM/RUIM/USIM 326 may store additional subscriber information for a mobile device as well, including datebook (or calendar) information and recent call information. Alternatively, user identification information can also be programmed into the flash memory 308.

The mobile device 10 is typically a battery-powered device and includes a battery interface 332 for receiving one or more batteries 330 (typically rechargeable). In at least some examples, the battery 330 can be a smart battery with an embedded microprocessor. The battery interface 332 is coupled to a regulator (not shown), which assists the battery 330 in providing power V+ to the mobile device 10. Although current technology makes use of a battery, future technologies such as micro fuel cells may provide the power to the mobile device 10.

The mobile device 10 also includes an operating system 334 and software components 336 to 346 which are described in more detail below. The operating system 334 and the software components 336 to 346 that are executed by the main processor 302 are typically stored in a persistent store such as the flash memory 308, which may alternatively be a read-only memory (ROM) or similar storage element (not shown). Those skilled in the art will appreciate that portions of the operating system 334 and the software components 336 to 346, such as specific device applications, or parts thereof, may be temporarily loaded into a volatile store such as the RAM 306. Other software components can also be included, as is well known to those skilled in the art.

The subset of software applications 336 that control basic device operations, including data and voice communication applications, may be installed on the mobile device 10 during its manufacture. Other software applications include message applications 338 that can be any suitable software program that allows a user of the mobile device 10 to send and receive electronic messages, as described above. Various alternatives exist for the message application 338 as is well known to those skilled in the art. Messages that have been sent or received by the user are typically stored in the flash memory 308 of the mobile device 10 or some other suitable storage element in the mobile device 10. In at least some examples, some of the sent and received messages may be stored remotely from the mobile device 10 such as in a data store of an associated host system that the mobile device 10 communicates with.

The software applications can further include a device state module 340, a Personal Information Manager (PIM) 342, and other suitable modules (not shown). The device state module 340 provides persistence, i.e. the device state module 340 ensures that important device data is stored in persistent memory, such as the flash memory 308, so that the data is not lost when the mobile device 10 is turned off or loses power.

The PIM 342 includes functionality for organizing and managing data items of interest to the user, such as, but not limited to, e-mail, contacts, calendar events, voice mails, appointments, and task items. A PIM application has the ability to send and receive data items via the wireless network 12. PIM data items may be seamlessly integrated, synchronized, and updated via the wireless network 12 with the mobile device subscriber's corresponding data items stored and/or associated with a host computer system. This functionality creates a mirrored host computer on the mobile device 10 with respect to such items. This can be particularly advantageous when the host computer system is the mobile device subscriber's office computer system.

The mobile device 10 may also comprise a connect module 344, and an IT policy module 346. The connect module 344 implements the communication protocols that are required for the mobile device 10 to communicate with the wireless infrastructure and any host system, such as an enterprise system, that the mobile device 10 is authorized to interface with.

The connect module 344 includes a set of APIs that can be integrated with the mobile device 10 to allow the mobile device 10 to use any number of services associated with the enterprise system. The connect module 344 allows the mobile device 10 to establish an end-to-end secure, authenticated communication pipe with a host system (not shown). A subset of applications for which access is provided by the connect module 344 can be used to pass IT policy commands from the host system to the mobile device 10. This can be done in a wireless or wired manner. These instructions can then be passed to the IT policy module 346 to modify the configuration of the device 10. Alternatively, in some cases, the IT policy update can also be done over a wired connection.

The IT policy module 346 receives IT policy data that encodes the IT policy. The IT policy module 346 then ensures that the IT policy data is authenticated by the mobile device 10. The IT policy data can then be stored in the flash memory 308 in its native form. After the IT policy data is stored, a global notification can be sent by the IT policy module 346 to all of the applications residing on the mobile device 10. Applications for which the IT policy may be applicable then respond by reading the IT policy data to look for IT policy rules that are applicable.

Other types of software applications or components 339 can also be installed on the mobile device 10. These software applications 339 can be pre-installed applications (i.e. other than message application 338) or third party applications, which are added after the manufacture of the mobile device 10. Examples of third party applications include games, calculators, utilities, etc.

The additional applications 339 can be loaded onto the mobile device 10 through at least one of the wireless network 12, the auxiliary I/O subsystem 312, the data port 314, the short-range communications subsystem 322, or any other suitable device subsystem 324. This flexibility in application installation increases the functionality of the mobile device 10 and may provide enhanced on-device functions, communication-related functions, or both. For example, secure communication applications may enable electronic commerce functions and other such financial transactions to be performed using the mobile device 10.

The data port 314 enables a subscriber to set preferences through an external device or software application and extends the capabilities of the mobile device 10 by providing for information or software downloads to the mobile device 10 other than through a wireless communication network. The alternate download path may, for example, be used to load an encryption key onto the mobile device 10 through a direct and thus reliable and trusted connection to provide secure device communication.

The data port 314 can be any suitable port that enables data communication between the mobile device 10 and another computing device. The data port 314 can be a serial or a parallel port. In some instances, the data port 314 can be a universal serial bus (USB) port that includes data lines for data transfer and a supply line that can provide a charging current to charge the battery 330 of the mobile device 10.

The short-range communications subsystem 322 provides for communication between the mobile device 10 and different systems or devices, without the use of the wireless network 12. For example, the subsystem 322 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download may be processed by the communication subsystem 54 and input to the main processor 302. The main processor 302 may then process the received signal for output to the display 310 or alternatively to the auxiliary I/O subsystem 312. A subscriber may also compose data items, such as e-mail messages, for example, using the keyboard 316 in conjunction with the display 310 and possibly the auxiliary I/O subsystem 312. The auxiliary subsystem 312 may include devices such as: a touch screen, mouse, track ball, infrared fingerprint detector, or a roller wheel with dynamic button pressing capability. The keyboard 316 is an alphanumeric keyboard and/or telephone-type keypad. However, other types of keyboards may also be used, such as a virtual or "soft" keyboard rendered as images on a touch screen. A composed item may be transmitted over the wireless network 12 through the communication subsystem 54.

For voice communications, the overall operation of the mobile device 10 in this example is substantially similar, except that the received signals are output to the speaker 318, and signals for transmission are generated by the microphone 320. Alternative voice or audio I/O subsystems, such as a voice message recording subsystem, can also be implemented on the mobile device 10. Although voice or audio signal output is accomplished primarily through the speaker 318, the display 310 can also be used to provide additional information such as the identity of a calling party, duration of a voice call, or other voice call related information.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 10, any component of or related to the wireless network 12, etc., or accessible or connectable thereto. Any application or module herein described may be implemented using computer readable/executable instructions that may be stored or otherwise held by such computer readable media.

It will also be appreciated that the example embodiments and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the spirit of the invention or inventions. For instance, the steps may be performed in a differing order, or steps may be added, deleted, or modified.

Although the above has been described with reference to certain specific embodiments, various modifications thereof will be apparent to those skilled in the art without departing from the scope of the claims appended hereto.

The invention claimed is:

1. A method of operating a mobile device, the method comprising:
   displaying a message exchange user interface of a message exchange application, the message exchange user interface comprises a message exchange between a user of the mobile device and a contact of the user;
   displaying a first object in a portion of the message exchange user interface without obstructing existing message exchange content in the message exchange user interface;
   obtaining contextual information related to the contact, the contextual information being additional to the existing message exchange content displayed in the message exchange user interface and having been obtained on the mobile device, from at least one application other than the message exchange application to provide additional information regarding the contact during the message exchange;
   changing an appearance of the first object from a first appearance to a second appearance in response to receipt of the contextual information, the second appearance being independent of a representation of the at least one application and independent of representing content of the contextual information;
   in response to detecting a user selection of the first object, displaying a second object larger than the first object in the message exchange user interface, wherein the second object does not overlap the first object;
   gradually enlarging the second object in the message exchange user interface during a drag operation applied to the second object, to provide a third object; and
   displaying the additional contextual information related to the contact using the third object,
   wherein a display of the existing message exchange content, based on the gradually enlarging the second object, is resized so that all of the existing message exchange content is not obstructed.

2. The method according to claim 1, wherein changing the appearance of the first object comprises displaying the second appearance as a visual wiggling motion of the first object.

3. The method according to claim 1, wherein the third object consumes a larger portion of a display screen than the second object without obstructing the existing message exchange content.

4. The method according to claim 1, further comprising:
   after detecting a user input associated with the third object, removing the third object and redisplaying the first object.

5. The method according to claim 1, wherein the message exchange user interface is an instant messaging user interface, and wherein proving the third object comprises displaying the third object in the instant messaging user interface.

6. The method according to claim 1, wherein the first, second and third objects are displayed adjacent to messages exchanged with the contact.

7. The method according to claim 1, wherein the first, second and third objects are displayed in a banner portion of the message exchange user interface.

8. The method according to claim 1, wherein the first object comprises a blank tab, and wherein changing the appearance of the first object comprises changing one of a color of the blank tab or an intensity of a boarder of the blank tab.

9. A mobile device comprising a processor, a display, and memory, the memory storing computer executable instructions for:
   displaying a message exchange user interface of a message exchange application, the message exchange user interface comprises a message exchange between a user of the mobile device and a contact of the user;
   displaying a first object in a portion of the message exchange user interface without obstructing existing message exchange content in the message exchange user interface;
   obtaining contextual information related to the contact, the contextual information being additional to the existing message exchange content displayed in the message exchange user interface and having been obtained on the mobile device, from at least one application other than the message exchange application to provide additional information regarding the contact during the message exchange;
   changing an appearance of the first object from a first appearance to a second appearance in response to receipt of the contextual information, the second appearance being independent of a representation of the at least one application and independent of representing content of the contextual information;
   in response to detecting a user selection of the first object, displaying a second object larger than the first object in the message exchange user interface, wherein the second object does not overlap the first object;
   gradually enlarging the second object in the message exchange user interface during a drag operation applied to the second object, to provide a third object; and
   displaying the additional contextual information related to the contact using the third object,
   wherein a display of the existing message exchange content, based on the gradually enlarging the second object, is resized so that all of the existing message exchange content is not obstructed.

10. The mobile device according to claim 9, wherein changing the appearance of the first object comprises displaying the second appearance as a visual wiggling motion of the first object.

11. A non-transitory computer readable medium comprising computer executable instructions for operating a mobile device, the computer executable instruction comprising instructions for:
   displaying a message exchange user interface of a message exchange application, the message exchange user interface comprising a message exchange between a user of the mobile device and a contact of the user;
   displaying a first object in a portion of the message exchange user interface without obstructing existing message exchange content in the message exchange user interface;
   obtaining contextual information related to the contact, the contextual information being additional to the existing message exchange content displayed in the message exchange user interface and having been obtained on the mobile device from at least one application other than the message exchange application to provide additional information regarding the contact during the message exchange;
   changing an appearance of the first object from a first appearance to a second appearance in response to receipt of the contextual information, the second appearance being independent of a representation of the at least one application and independent of representing content of the contextual information;

in response to detecting a user selection of the first object, displaying a second object larger than the first object in the message exchange user interface, wherein the second object does not overlap the first object;

gradually enlarging the second object in the message exchange user interface during a drag operation applied to the second object, to provide a third object; and displaying the additional contextual information related to the contact using the third object, wherein a display of the existing message exchange content, based on the gradually enlarging the second object, is resized so that all of the existing message exchange content is not obstructed.

12. The non-transitory computer readable medium according to claim 11, wherein the third object consumes a larger portion of a display screen than the second object without obstructing the existing message exchange content.

13. The non-transitory computer readable medium according to claim 11, further comprising instructions for:
after detecting a user input associated with the third object, removing the third object and redisplaying the first object.

14. The non-transitory computer readable medium according to claim 11, wherein the message exchange user interface is an instant messaging user interface, and wherein proving the third object comprises displaying the third object in the instant messaging user interface.

15. The non-transitory computer readable medium according to claim 11, wherein the first, second and third objects are displayed adjacent to messages exchanged with the contact.

16. The non-transitory computer readable medium according to claim 11, wherein the first, second and third objects are displayed in a banner portion of the message exchange user interface.

17. A method of operating a mobile device, the method comprising:
displaying a list of a plurality of instant messaging contacts and their corresponding instant messaging conversations with a user of the mobile device in a first user interface for an instant messaging application;

displaying a first object in association with at least one of the list of instant messaging contacts without obstructing the list of a plurality of instant messaging contacts and their corresponding instant messaging conversations with the user;

obtaining contextual information related to a particular one of the at least one of the instant messaging contacts, the contextual information being additional to the instant messaging conversations and having been obtained on the mobile device, from at least one application other than the instant messaging application to provide additional information regarding the contact during a message exchange;

changing an appearance of the first object from a first appearance to a second appearance in response to receipt of the contextual information, the second appearance being independent of a representation of the at least one application and independent of representing content of the contextual information;

in response to detecting a user selection of the first object, displaying a second object larger than the first object in the first user interface, wherein the second object does not overlap the first object;

gradually enlarging the second object in the first user interface during a drag operation applied to the second object, to provide a third object; and displaying the additional contextual information related to the particular one of the at least one of the instant messaging contacts using the third object, wherein a display of the instant messaging conversations, based on the gradually enlarging the second object, is resized so that all of the instant messaging conversation is not obstructed.

18. The method according to claim 17, further comprising: displaying the first object in an instant messaging conversation user interface for the particular one of the at least one instant messaging contacts, and wherein proving the third object comprises displaying the third object in the instant messaging user interface.

* * * * *